United States Patent
Kobayashi et al.

(10) Patent No.: US 11,782,612 B2
(45) Date of Patent: Oct. 10, 2023

(54) MEMORY SYSTEM, METHOD OF CONTROLLING ACCESS TO MEMORY SYSTEM, AND MOBILE COMPUTING DEVICE

(71) Applicant: KIOXIA CORPORATION, Tokyo (JP)

(72) Inventors: Hirotomo Kobayashi, Yokosuka Kanagawa (JP); Yoshiyuki Kudoh, Kawasaki Kanagawa (JP); Kentaro Umesawa, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/410,722

(22) Filed: Aug. 24, 2021

(65) Prior Publication Data

US 2022/0091759 A1 Mar. 24, 2022

(30) Foreign Application Priority Data

Sep. 18, 2020 (JP) ................. 2020-157075

(51) Int. Cl.
*G06F 3/06* (2006.01)
*G06F 21/79* (2013.01)

(52) U.S. Cl.
CPC .......... *G06F 3/0623* (2013.01); *G06F 3/0604* (2013.01); *G06F 3/067* (2013.01); *G06F 3/0659* (2013.01); *G06F 3/0679* (2013.01); *G06F 21/79* (2013.01); *G06F 2221/0755* (2013.01)

(58) Field of Classification Search
CPC ............ G06F 21/79; G06F 2221/0755; G06F 3/0604; G06F 3/062; G06F 3/0623; G06F 3/0659; G06F 3/0661; G06F 3/067; G06F 3/0679

See application file for complete search history.

(56) References Cited

U.S. PATENT DOCUMENTS

| 5,555,304 A * | 9/1996 | Hasebe ................. G06F 21/80 713/193 |
| 9,961,088 B2 | 5/2018 | Hughes, Jr. et al. |
| 10,095,638 B2 | 10/2018 | Sanuki |
| 10,511,932 B2 | 12/2019 | Joo et al. |
| 2003/0191949 A1 | 10/2003 | Odagawa |
| 2015/0181511 A1 | 6/2015 | Abraham et al. |
| 2015/0229644 A1 | 8/2015 | Nozawa et al. |
| 2018/0247169 A1 | 8/2018 | Kafader et al. |

FOREIGN PATENT DOCUMENTS

| JP | 5960865 B2 | 8/2016 |
| TW | 201344486 A | 11/2013 |
| TW | 202029042 A | 8/2020 |

* cited by examiner

*Primary Examiner* — Yong J Choe
(74) *Attorney, Agent, or Firm* — Kim & Stewart LLP

(57) ABSTRACT

A memory system includes a nonvolatile memory and a controller that controls the nonvolatile memory. The controller is configured to generate information relating to encryption and decryption of data based on a location of the memory system and to enable at least one process of encrypting data to be written to the nonvolatile memory or decrypting data read from the nonvolatile memory by using the information.

16 Claims, 25 Drawing Sheets

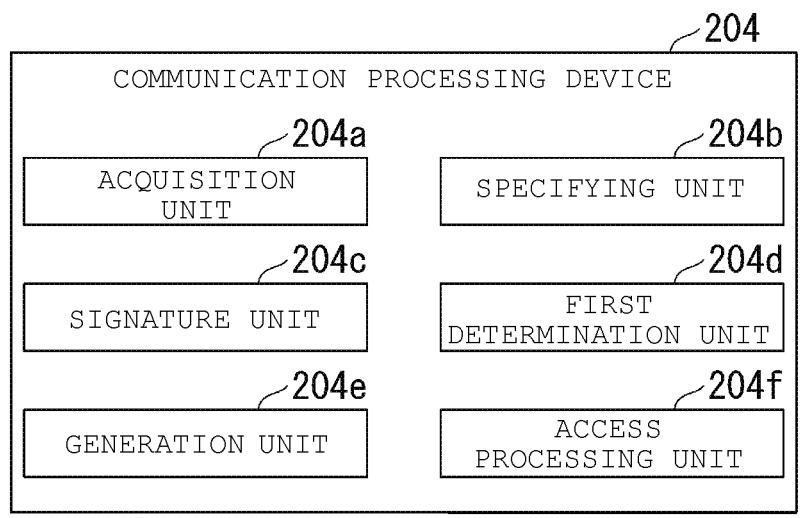

| SECOND INFORMATION PROCESSING DEVICE | LATITUDE/ LONGITUDE | ALLOWABLE RANGE (LATITUDE/LONGITUDE) |
|---|---|---|
| #1 | AA1/BB1 | ±aa1/±bb1 |
| #2 | AA2/BB2 | ±aa2/±bb2 |
| ... | ... | ... |

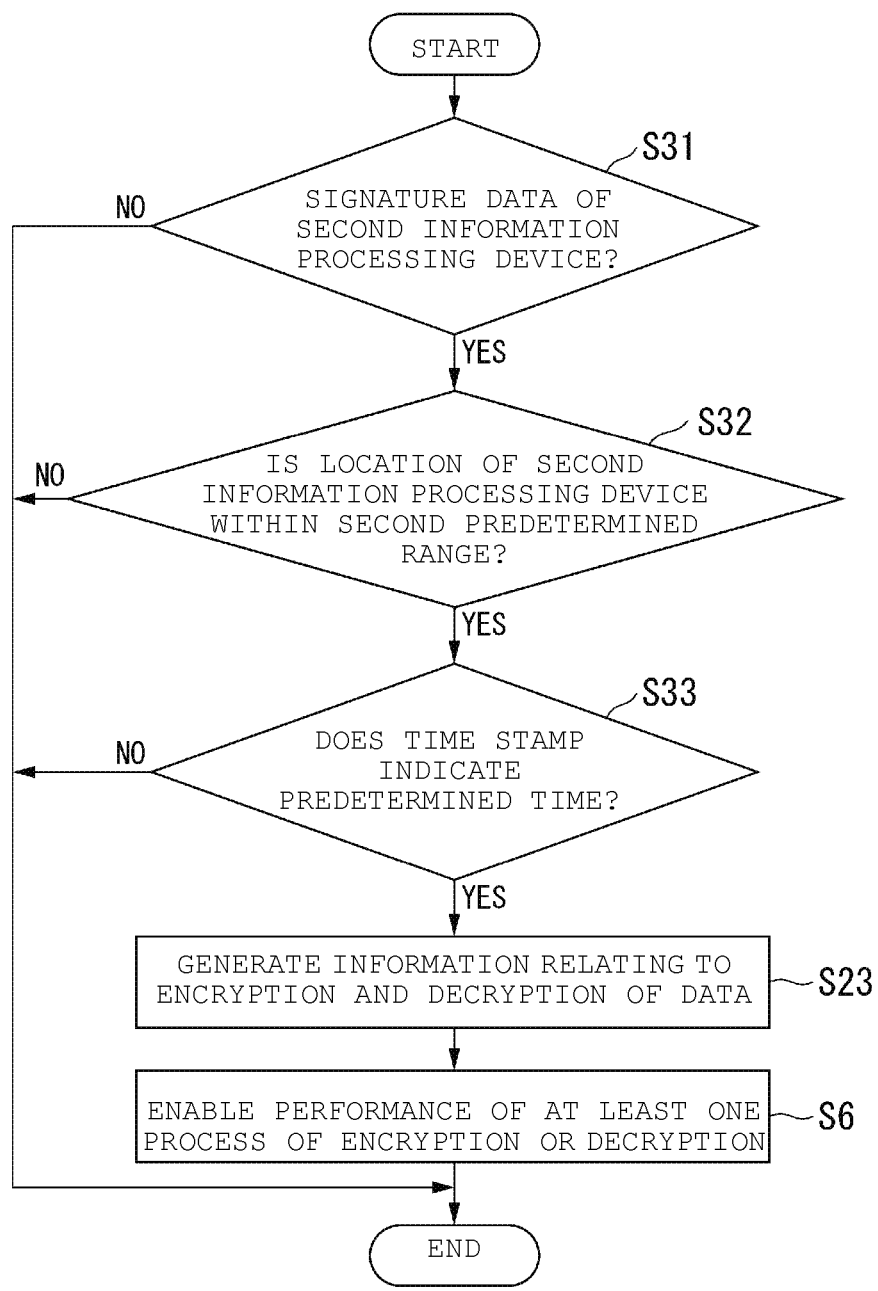

MEMORY SYSTEM, METHOD OF CONTROLLING ACCESS TO MEMORY SYSTEM, AND MOBILE COMPUTING DEVICE

CROSS-REFERENCE TO RELATED APPLICATION

This application is based upon and claims the benefit of priority from Japanese Patent Application No. 2020-157075, filed Sep. 18, 2020, the entire contents of which are incorporated herein by reference.

FIELD

Embodiments described herein relate generally to a memory system, a method of controlling access to a memory system, and a mobile computing device.

BACKGROUND

A read operation of data that is stored in a memory system is performed by applying a read voltage to a word line connected to a memory cell. When the memory system is stolen, it may be possible to easily access the data stored in the memory system.

BRIEF DESCRIPTION OF THE DRAWINGS

FIG. 2 is a diagram illustrating an example of reference voltage information according to the first embodiment.

FIG. 3 is a block diagram illustrating a configuration of a communication processing device of the first embodiment.

FIG. 4 is a diagram illustrating an example of a first predetermined range according to the first embodiment.

FIG. 31 is a diagram illustrating an example of a predetermined time range according to the fourth embodiment.

FIG. 32 is a diagram illustrating an example of a process flow of a memory system according to the fourth embodiment.

DETAILED DESCRIPTION

Figure 1:
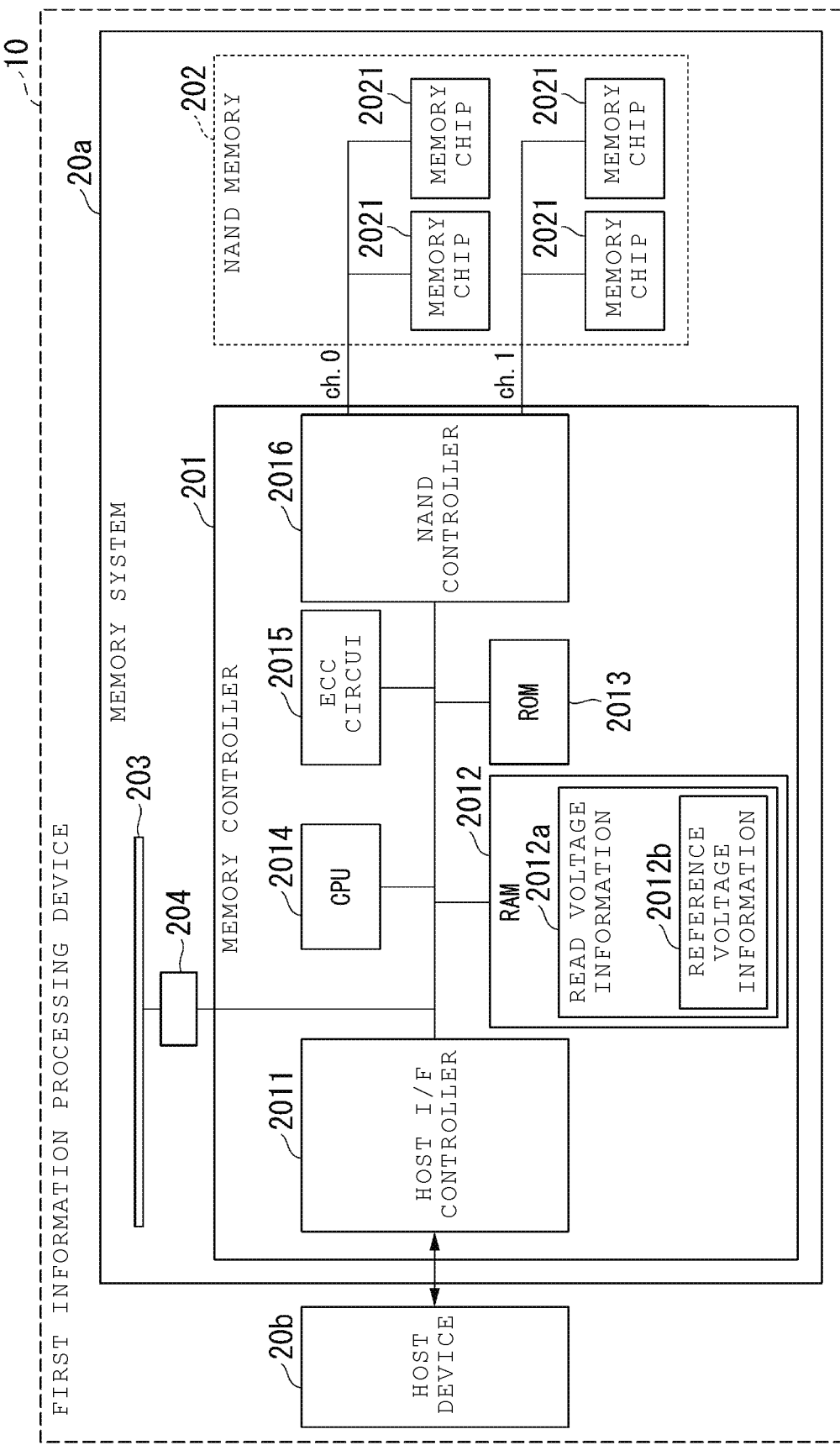
FIG. 1 is a diagram illustrating an example of a configuration of a first information processing device according to a first embodiment.

Embodiments provide a memory system that can improve confidentiality of data stored therein.

In general, according to one embodiment, a memory system includes a nonvolatile memory and a controller that controls the nonvolatile memory. The controller is configured to generate information relating to encryption and decryption of data based on a location of the memory system and to enable at least one process of encrypting data to be written to the nonvolatile memory or decrypting data read from the nonvolatile memory by using the information.

Hereinafter, an information processing system according to embodiments is described with reference to the drawings. In the following description, configurations having the same or similar functions are designated by the same reference numerals, and duplicate descriptions may be omitted. In this specification, the term. "based on XX" means "based on at least XX" and includes a case of being based on another element in addition to XX. Further, the term. "based on XX" is not limited to a case of directly using XX, but also includes a case of being based on those obtained by performing calculation or processing on XX. "XX" is any element (for example, any kind of information).

In the present specification, the term "reading" may be referred to as "read", and the term "writing" may be referred to as "write". Further, in the present specification, the terms "write", "memorize", and "store" are used to have the same meaning. Therefore, these terms are interchangeably read. In the present specification, the term "connection" is not limited to a mechanical connection but includes an electrical connection. The term "being acquired" by a component in the present specification is not limited to a case of obtaining something from the outside of the component and also includes a case where the component calculates something by itself. In the present specification, "per bit line" and "unit of bit line" can be interchangeably read as "per column" and "column unit".

Further, in the present specification, the term "encryption and decryption by using YY" is not limited to a case where encryption and decryption are performed by directly using YY (that is, by using YY itself as key information), but also includes a case where encryption and decryption are performed by indirectly using YY (for example, by using key information generated by a calculation or a process on YY). "YY" is any element (for example, any kind of information).

First Embodiment

<Configuration of First Information Processing Device>

FIG. 1 is a diagram illustrating an example of a configuration of a first information processing device 10 according to a first embodiment. The first information processing device 10 includes a memory system 20a and a host device 20b. According to the present embodiment, an access to the memory system 20a is limited based on a location of the memory system 20a. The first information processing device 10 is provided, for example, in a data center.

The memory system 20a is connected to the host device 20b. The host device 20b may be a server device, a personal computer, or a mobile-type information processing device. The memory system 20a is configured to function as an external storage device of the host device 20b. The host device 20b can issue an access request (a read request or a write request) to the memory system 20a.

The memory system 20a includes a memory controller 201, a NAND-type flash memory (NAND memory) 202, an antenna 203, and a communication processing device 204. The memory controller 201 and the NAND memory 202 are connected to each other via a plurality of channels. The antenna 203 and the communication processing device 204 are connected to each other via a signal line. The communication processing device 204 and the memory controller 201 are connected to each other via another signal line. The memory controller 201 is an example of a "controller". The NAND memory 202 is an example of a "memory device". The memory controller 201, the NAND memory 202, the antenna 203, and the communication processing device 204 are installed, for example, on a printed board.

The antenna 203 receives radio waves transmitted from a satellite of a global navigation satellite system (GNSS). Examples of the GNSS include a global positioning system (GPS).

The memory controller 201 includes a host interface controller (host I/F controller) 2011, a random access memory (RAM) 2012, a read only memory (ROM) 2013, a central processing unit (CPU) 2014, an error correcting code (ECC) circuit 2015, and a NAND controller 2016. These functional units are connected to each other via a bus. The memory controller 201 is configured with, for example, a semiconductor integrated circuit such as a System on a Chip (SoC) and these functional units are integrated in one chip. However, some of these functional units may be provided outside the memory controller 201.

The host I/F controller 2011 controls the communication interface between the host device 20b and the memory system 20a and controls data transmission between the host device 20b and the RAM 2012 under the control of the CPU 2014.

The RAM 2012 is, for example, a synchronous dynamic random access memory (SDRAM) or a static random access memory (SRAM), but the embodiment is not limited thereto. The RAM 2012 functions as a buffer for data transmission between the host device 20b and the NAND memory 202. In addition, the RAM 2012 provides the CPU 2014 with a work area. Firmware (program) stored in the NAND memory 202 or the ROM 2013 is loaded into the RAM 2012 during the operation of the memory system 20a.

The CPU 2014 is an example of a hardware processor. The CPU 2014 performs various processes, for example, by executing firmware loaded into the RAM 2012. The configuration of the CPU 2014 and details of the processes performed by the CPU 2014 are described below. Note that a plurality of CPUs 2014 may be provided.

The ECC circuit 2015 encodes data to be written to the NAND memory 202 (hereinafter, referred to as "write data") for error correction. If there is an error in data read from the NAND memory 202 (hereinafter, referred to as "read data"), the ECC circuit 2015 corrects the error of the read data based on an error correction code assigned during the write operation.

The NAND controller 2016 controls each channel (ch. 0 and ch. 1). The NAND controller 2016 controls data transmission between the RAM 2012 and the NAND memory 202 under the control of the CPU 2014.

The NAND memory 202 includes a plurality of (here, four) nonvolatile semiconductor memory chips 2021. According to the present embodiment, the memory controller 201 includes two channels (ch. 0 and ch. 1). The memory controller 201 may include one channel or three or more channels. In the example of FIG. 1, two memory chips 2021 are connected to each channel. Note that one memory chip 2021 or three or more memory chips 2021 may be connected to each channel.

Each channel includes an Input/Output (I/O) signal line, a control signal line, a chip enable (CE) signal line, and a ready (RY)/busy (BY) signal line. The I/O signal line transmits data, addresses, and various commands. The memory controller 201 transmits a read command, a write command, or an erase command to the memory chips 2021 via the I/O signal line. The control signal line may include a write enable (WE) signal line, a read enable (RE) signal line, a command latch enable (CLE) signal line, an address latch enable (ALE) signal line, and a write protect (WP) signal line. The CE signal line transmits a signal indicating that the memory chips 2021 are being selected. The RY/BY signal line transmits a signal indicating whether the NAND memory 202 is operating. The RY/BY signal line indicates a ready state (RY) corresponding to a non-in-operation state with a high level signal and a busy state (BY) corresponding to an in-operation state with a low level signal.

When the operation of the memory system 20a starts, for example, read voltage information 2012a stored in the memory chip 2021 is loaded into the RAM 2012. The read voltage information 2012a is information to be used for setting a value of read voltage applied to each word line WL described below, during the read operation of the NAND memory 202. The read voltage information 2012a includes reference voltage information 2012b. The memory cell in the memory chip 2021 stores data according to a threshold voltage in a non-volatile manner. The threshold voltage of the memory cell may change due to stress such as program disturb, read disturb, or data retention. Therefore, the read voltage information 2012a may include information relating to a correction value for correcting the read voltage.

FIG. 2 is a diagram illustrating an example of the reference voltage information 2012b included in the read voltage information 2012a. In FIG. 2, values of VAD to VGD are values indicating reference values (for example, initial setting values) of read voltages VA to VG, respectively. The reference voltage information 2012b may be set commonly (i.e., set to the same value) for the plurality of memory chips 2021. Alternatively, the reference voltage information 2012b may independently set for each memory chip 2021.

The memory controller 201 calculates a value of a read voltage to be applied to each word line WL based on the read voltage information 2012a. The memory controller 201 instructs the NAND memory 202 to apply the read voltage of the calculated value.

<Configuration of Communication Processing Device>

FIG. 3 is a diagram illustrating an example of a configuration of the communication processing device 204. The communication processing device 204 may be a semiconductor integrated circuit such as a central processing unit (CPU), a field programmable gate array (FPGA), and an application specific integrated circuit (ASIC). The communication processing device 204 is programmed or configured to function as an acquisition unit 204a, a specifying unit 204b, a signature unit 204c, a first determination unit 204d, a generation unit 204e, and an access processing unit 204f.

The acquisition unit 204a receives radio waves from a satellite via the antenna 203.

The specifying unit 204b specifies a location of the memory system 20a based on the radio waves received by the acquisition unit 204a. For example, the specifying unit 204b specifies the location of the memory system 20a based on the radio waves received by the acquisition unit 204a respectively from four different satellites. Specifically, the radio waves include information of identifiers unique to the satellites that have transmitted the radio waves and information of the time when the radio waves were transmitted. The specifying unit 204b calculates distances between the memory system 20a and the four respective satellites from the propagation speed of radio waves (that is, the speed of light), the transmission time of the radio waves, and the reception time of the radio waves. Also, the specifying unit 204b specifies the location of the memory system 20a by determining a point at which the obtained four distances intersect with each other. Note that, in the calculation, the location of the memory system 20a can be specified with information on at least three distances. However, each time includes a slight error caused by the accuracy of a clock. Therefore, the specifying unit 204b adds information of another distance to the information of three distances to correct the error. The location may be indicated by, for example, latitude and longitude. However, the location may be indicated by an altitude in addition to the latitude and the longitude.

The signature unit 204c generates predetermined signature data for the location data of the memory system 20a specified by the specifying unit 204b. For example, the signature unit 204c generates the predetermined signature data for the location data by using a private key based on the RSA algorithm. The private key is stored in a hardware security module device such as a universal serial bus (USB) dongle. According to this process of the signature unit 204c, thereafter, the falsification of the location of the memory system 20a specified by the specifying unit 204b can be prevented.

The first determination unit 204d determines whether the location of the memory system 20a specified by the specifying unit 204b is within a first predetermined range. The first predetermined range is set as a location in which the memory system 20a is permitted to be accessed from outside to the memory system 20a via the host device 20b. For example, if the inside of a data center is set as the first predetermined range, the allowable ranges are respectively set with respect to the latitude and the longitude of the data center in consideration of the size of the data center, and an accuracy of the location of the memory system 20a specified by the specifying unit 204b. This first predetermined range is loaded from the memory chip 2021 to the RAM 2012 at the time of the operation start of the memory system 20a. FIG. 4 is a diagram illustrating an example of the first predetermined range. In FIG. 4, with respect to the latitude and the longitude of the location where the memory system 20a is installed, the allowable ranges of the latitude and the allowable ranges of the longitude are defined to indicate the first predetermined range. The first determination unit 204d reads the information relating to the first predetermined range. The first determination unit 204d can determine whether the location of the memory system 20a is within the first predetermined range, by comparing the read first predetermined range and the location of the memory system 20a specified by the specifying unit 204b.

The generation unit 204e generates an encryption key used when the data is encrypted, based on the location of the memory system 20a specified by the specifying unit 204b. The generation unit 204e may generate different encryption keys according to the location of the memory system 20a. The encryption key is an example of information relating to the encryption and decryption of data. For example, the first determination unit 204d determines, for example, that the location of the memory system 20a is within the first predetermined range, the generation unit 204e generates the encryption key. In addition, if the first determination unit 204d determines that the location of the memory system 20a is outside the first predetermined range, the generation unit 204e does not generate the encryption key.

If the memory system 20a receives a read request of data from the outside via the host device 20b, the generation unit 204e generates a decryption key to be used when the encrypted data is decrypted, based on the location of the memory system 20a specified by the specifying unit 204b. The generation unit 204e may generate different decryption keys according to the location of the memory system 20a. The decryption key is an example of information relating to the encryption and decryption of data. For example, if the memory system 20a receives the read request of data from the outside via the host device 20b and the first determination unit 204d determines that the location of the memory system 20a is within the first predetermined range, the generation unit 204e generates the decryption key. In addition, if the memory system 20a receives the read request of data from the outside via the host device 20b and the first determination unit 204d determines that the location of the memory system 20a is outside the first predetermined range, the generation unit 204e does not generate the decryption key.

In addition, the generation unit 204e determines whether signature data generated for the location data of the memory system 20a is the signature data of the signature unit 204c, by using a predetermined public key. The predetermined public key is paired with the private key used by the signature unit 204c to generate the signature data. That is, the predetermined public key is a public key used for decrypting the signature data to data that can be read by the generation unit 204e.

If the generation unit 204e generates the information relating to the encryption and decryption of data, the access processing unit 204f enables at least one of a process of encrypting data written to the NAND memory 202 by the CPU 2014 or a process of decrypting the data read from the NAND memory 202 by the CPU 2014, by using the information relating to the encryption and decryption of data generated by the generation unit 204e.

For example, if the memory system 20a receives a write request of data and the generation unit 204e generates the encryption key, the access processing unit 204f transmits the encryption key generated by the generation unit 204e to the memory controller 201. The CPU 2014 of the memory controller 201 encrypts the write data to be written to the NAND memory 202 by using the encryption key. Also, the NAND controller 2016 of the memory controller 201 writes the encrypted data to the NAND memory 202.

For example, the memory system 20a receives a read request of data, and the generation unit 204e generates the decryption key, the access processing unit 204f transmits the decryption key generated by the generation unit 204e to the memory controller 201. The NAND controller 2016 of the memory controller 201 reads the encrypted data from the NAND memory 202. Also, the CPU 2014 of the memory controller 201 decrypts the encrypted data read from the NAND memory 202 by using the decryption key generated by the generation unit 204e.

<Configuration of Memory Chip>

Figure 5:
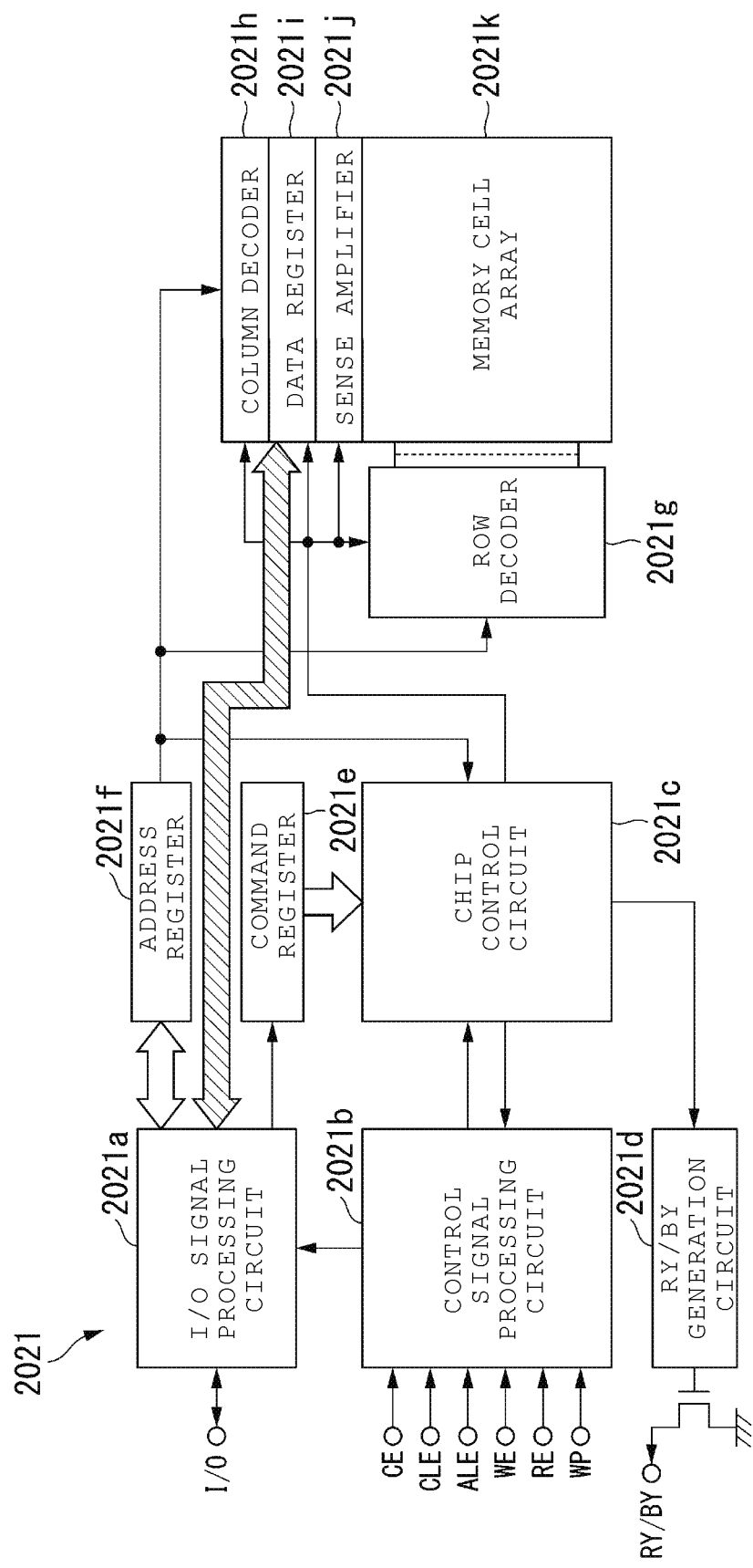
FIG. 5 is a block diagram illustrating an example of a configuration of a memory chip of the first embodiment.

FIG. 5 is a diagram illustrating an example of a configuration of the memory chip 2021. The memory chip 2021 includes, for example, an I/O signal processing circuit 2021a, a control signal processing circuit 2021b, a chip control circuit 2021c, a RY/BY generation circuit 2021d, a command register 2021e, an address register 2021f, a row decoder 2021g, a column decoder 2021h, a data register 2021i, a sense amplifier 2021j, and a memory cell array 2021k.

The I/O signal processing circuit 2021a is a buffer circuit for transmitting and receiving an I/O signal between the memory controller 201 and the memory chip 2021. A command, an address for designating an access destination, and data, which are latched by the I/O signal processing circuit 2021a, are stored in the command register 2021e, the address register 2021f, and the data register 2021i, respectively.

The address stored in the address register 2021f includes a chip number, a row address, and a column address. The chip number is identification information for distinguishing the memory chips 2021. The chip number, the row address, and the column address are sent to the chip control circuit 2021c, the row decoder 2021g, and the column decoder 2021h, respectively.

The control signal processing circuit 2021b receives the control signal. The control signal processing circuit 2021b executes the distribution of the I/O signal received by the I/O signal processing circuit 2021a to a particular storage destination, based on the received control signal. The control signal processing circuit 2021b also transmits the received control signal to the chip control circuit 2021c.

The chip control circuit 2021c is a circuit that transitions a state based on various control signals received via the control signal processing circuit 2021b. The chip control circuit 2021c controls operations of the memory chips 2021.

The RY/BY generation circuit 2021d transitions the state of the RY/BY signal line between the ready state (RY) and the busy state (BY) under the control of the chip control circuit 2021c.

The sense amplifier 2021j senses states of memory cells MT (see FIG. 6) in the memory cell array 2021k in the read operation. The sense amplifier 2021j generates read data based on the sensed state. The sense amplifier 2021j stores the generated read data to the data register 2021i. The read data stored in the data register 2021i is sent to the I/O signal processing circuit 2021a via a data line and transmitted from the I/O signal processing circuit 2021a to the memory controller 201.

The memory cell array 2021k includes the plurality of memory cells MT and stores data. Specifically, the memory cell array 2021k includes a plurality of physical blocks BLK (see FIG. 6). Each physical block BLK includes the plurality of memory cells MT. The physical blocks BLK is a minimum unit of erasing data. That is, all data stored in one physical block BLK are collectively erased. In the following, the "physical block" is simply referred to as a "block".

Operations of the row decoder 2021g and the column decoder 2021h are described below.

<Configuration of Memory Cell Array>

Figure 6:
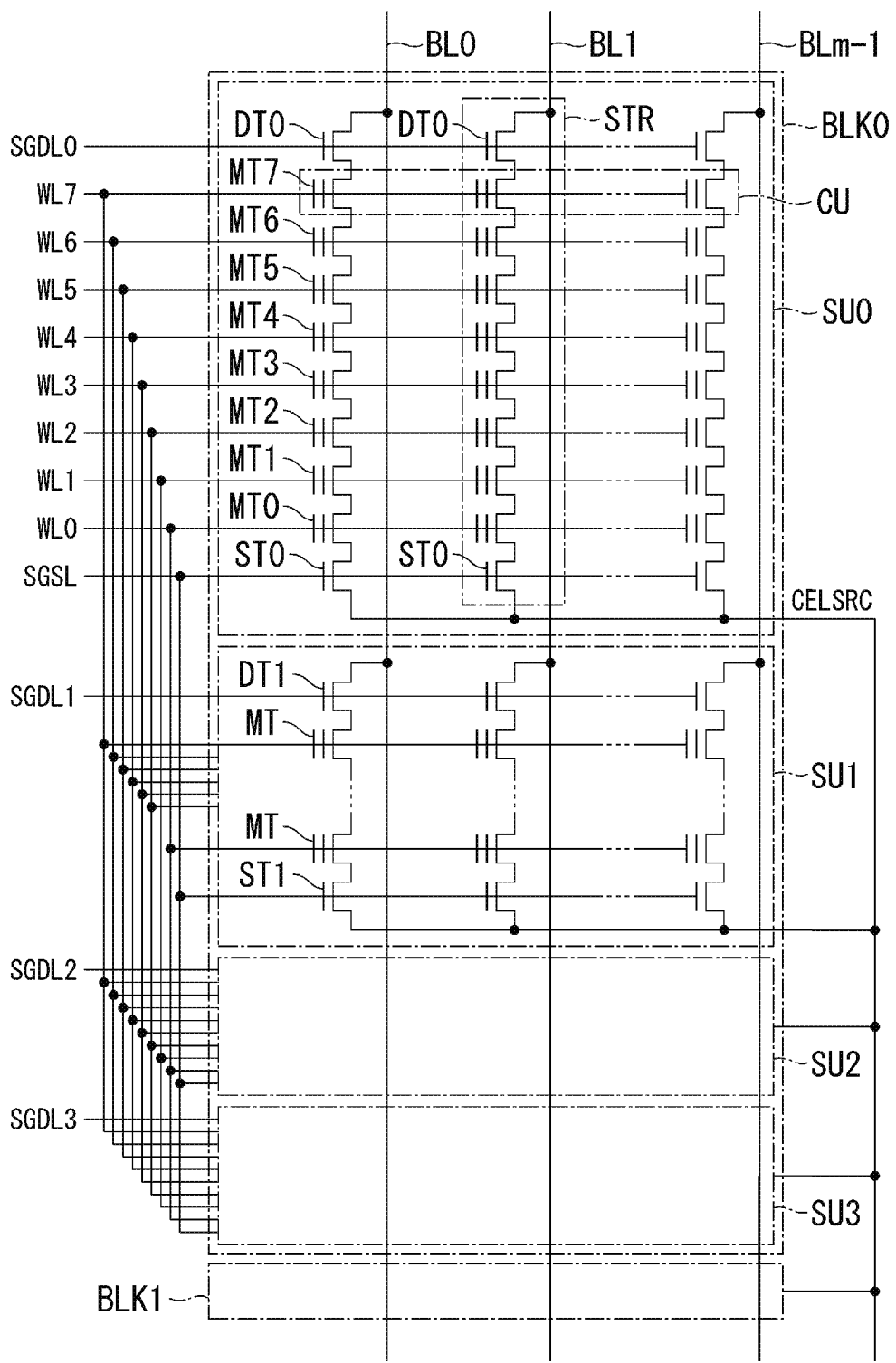
FIG. 6 is a diagram illustrating an example of a configuration of a memory cell array of the first embodiment.

FIG. 6 is a diagram illustrating an example of a configuration of the memory cell array 2021k. The memory cell array 2021k is, for example, a NAND-type flash memory having a three-dimensional structure in which the plurality of memory cells MT are arranged in a three-dimensional manner. The memory cell array 2021k includes the plurality of blocks BLK (BLK0, BLK1, and the like). For example, the memory cell array 2021k includes hundreds to thousands of blocks BLK.

As illustrated in FIG. 6, m (m is a natural number) bit lines BL (BL0 to BLm−1) are connected to a plurality of (for example, m) strings STR in each block BLK. Each string STR includes one first select gate transistor ST, the plurality of memory cells MT (MT0 to MT7), and one second select gate transistor DT. The first select gate transistor ST, the plurality of memory cells MT, and the second select gate transistor DT are connected in series in this order between a source line CELSRC and one bit line BL. The plurality of bit lines BL (BL0 to BLm−1) and the plurality of (m) strings STR respectively connected thereto make up one string unit SU. Each of the blocks BLK includes the plurality of (for example, four) string units SU (SU0 to SU3).

A control gate electrode of the first select gate transistor ST is connected to a first select gate line (source-side select gate line) SGSL. The first select gate line SGSL is a control signal line that controls the control gate electrode of the first select gate transistor ST. The first select gate transistor ST is selectively connected between the plurality of memory cells MT and the source line CELSRC based on the voltage applied via the first select gate line SGSL. The first select gate line SGSL may be connected independently to each of the string units SU (SU0 to SU3).

The control gate electrodes of the second select gate transistors DT are connected to second select gate lines (drain-side select gate lines) SGDL (SGDL0 to SGDL3). The second select gate lines SGDL are control signal lines for controlling the control gate electrodes of the second select gate transistors DT. The second select gate transistors DT are selectively connected between the plurality of memory cells MT and the bit lines BL based on the voltage applied via the second select gate lines SGDL.

Each memory cell (memory cell transistor) MT is configured with a metal oxide semiconductor field effect transistor (MOSFET) having a stacked gate structure. The stacked gate structure includes, for example, a floating gate formed with a tunnel oxide film interposed therebetween and a control gate electrode formed with a gate insulating film interposed above the floating gate. The threshold voltage of the memory cell MT changes according to the number of charges accumulated in the floating gate. In the memory cells MT, negative charges are injected into the floating gate by writing, and negative charges are removed from the floating gate by erasing. Any one of two or more data values can be written to each memory cell MT. Each memory cell MT stores one of one or more data values in a non-volatile manner, according to the threshold voltage thereof.

In the blocks BLK, the control gate electrodes of the memory cells MT are connected to the corresponding word lines WL, respectively. For example, the word lines WL0 to WL7 are connected to the control gate electrodes of the memory cells MT0 to MT7, respectively. The word lines WL are control signal lines for selecting a group of the memory cells MT arranged in one row in the memory cell array 2021$k$ and are commonly connected to one group of memory cells MT arranged in one row. The memory cells MT are provided at intersections between the word lines WL and the bit lines BL. The reading or writing from or to the memory cells MT can be performed by applying a certain voltage to the word line WL (hereinafter, referred to as "the selected word line WL") connected to the memory cells MT from or to which the reading or writing is performed. The reading and writing from and to the memory cells MT are described below.

In each block BLK, the word lines WL corresponding to the same address are commonly connected to the plurality of memory cells MT in the different strings STR. A group of memory cells MT that share the word line WL is referred to as a cell unit CU. Data is written collectively to and is read collectively from the plurality of memory cells MT in one cell unit CU. The storage capacity of one cell unit CU includes one or a plurality of pages.

The memory system 20$a$ may store a value of a plurality of bits in each memory cell MT. For example, if each memory cell MT stores a value of n (n≥2) bits, the storage capacity for each cell unit CU becomes equal to the size of n pages. Here, a case where each memory cell MT operates in a triple-level cell (TLC) mode in which a value of three bits is stored is described as an example.

In the triple-level cell (TLC) mode, data for three pages is stored in each cell unit CU connected to one word line WL. Among three pages stored in a cell unit CU connected to one word line WL, a page to which writing is performed first is referred to as a lower page, a page to which writing is performed after the lower page is referred to as a middle page, and a page to which writing is performed after the middle page is referred to as an upper page. In addition, a mode in which a program (that is, writing) is executed collectively to a part or all of the pages in one cell unit CU may be possible.

<Threshold Voltage Distribution of Memory Cell>

Figure 7:
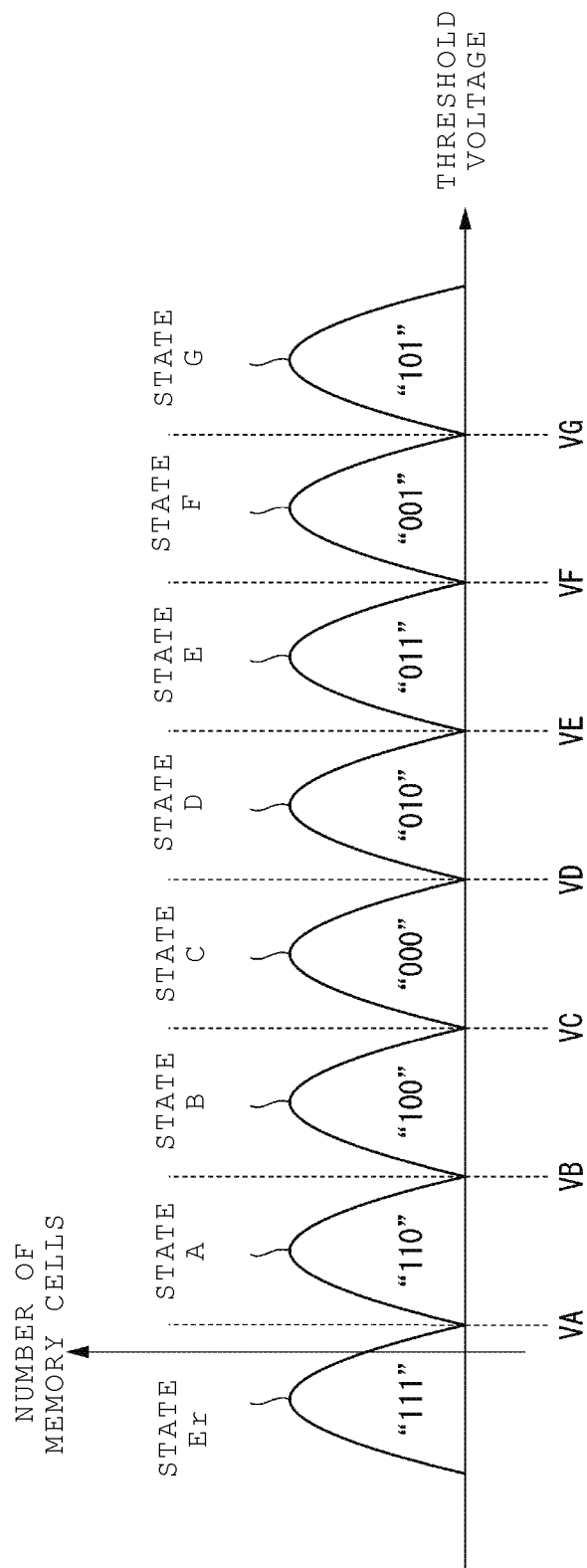
FIG. 7 is a diagram illustrating an example of a threshold voltage distribution of memory cells of the first embodiment.

FIG. 7 is a diagram illustrating threshold voltage distributions of the memory cells MT. In FIG. 7, the horizontal axis represents the threshold voltages of the memory cells MT, and the vertical axis represents the number of memory cells MT having a certain threshold voltage. If each memory cell MT operates in a triple-level cell (TLC) mode, the threshold voltage distribution of the memory cells MT includes eight distributions (lobes).

In the triple-level cell (TLC) mode, each memory cell MT can store eight-value data "xyz" defined by data "x" belonging to the upper page, data "y" belonging to the middle page, and data "z" belonging to the lower page. The values of the data "x", the data "y", and the data "z" are a binary data "0" or a binary data "1".

The threshold voltage of each memory cell MT is controlled so as to belong to any one of the eight states: ER state, A state, B state, C state, D state, E state, F state, and G state. The correspondence between each state and the data value of the eight-value data "xyz" are determined in advance. For example, a data value "111" is assigned to the Er state. A data value "110" is assigned to the A state. A data value "100" is assigned to the B state. A data value "000" is assigned to the C state. A data value "010" is assigned to the D state. A data value "011" is assigned to the E state. A data value "001" is assigned to the F state. A data value "101" is assigned to the G state. The correspondence of each state and the data value is not limited to the above.

Return to FIG. 5. Here, the row decoder 2021$g$, the column decoder 2021$h$, the data register 2021$i$, and the sense amplifier 2021$j$ of the NAND memory 202 are described. The row decoder 2021$g$, the column decoder 2021$h$, the data register 2021$i$, and the sense amplifier 2021$j$ are a part of peripheral circuits for the memory cell array 2021$k$. The peripheral circuit performs access (reading, writing, and erasing) on the memory cell array 2021$k$ based on the control by the chip control circuit 2021$c$.

For example, in the write operation, the column decoder 2021$h$ selects and activates the bit line BL corresponding to the column address. The sense amplifier 2021$j$ causes the voltage of the bit line BL selected by the column decoder 2021$h$ to be 0 volt. The row decoder 2021$g$ applies a programming pulse to the word line WL corresponding to the row address. The programming pulse is a pulse in which the voltage gradually increases at each application. Accordingly, charges are injected to the floating gate of the memory cell MT at the intersection between the selected bit line BL and the selected word line WL. As a result, the threshold voltage of the memory cell MT rises. The sense amplifier 2021$j$ checks whether the threshold voltage of the memory cell MT as a writing target reaches the voltage in accordance with the data stored in the data register 2021$i$ with each application of the programming pulse. According to the check result of the sense amplifier 2021$j$, the row decoder 2021g continues to apply the programming pulse until the threshold voltage of the memory cell MT reaches the voltage in accordance with the write data value.

On the other hand, in the read operation, the sense amplifier 2021j pre-charges a power voltage Vcc to the bit line BL. The row decoder 2021g sequentially applies various levels of read voltages corresponding to the different states, to the selected word line WL. In addition, the row decoder 2021g applies a read pass voltage to the non-selected word lines WL and causes the memory cells MT belonging to the non-selected word lines WL to be in a conductive state. The sense amplifier 2021j determines the data value stored in the memory cell MT of a reading target by detecting which read voltage causes the charges accumulated by the pre-charge to flow out to the source line CELSRC.

For example, as illustrated in FIG. 7, when the read voltage VA is set between the Er state and the A state, it is determined that the memory cell MT having a threshold voltage lower than the read voltage VA belongs to the Er state. In addition, when the read voltage VB is set between the A state and the B state, it is determined that the memory cell MT having a threshold voltage lower than the read voltage VB belongs to the Er state or the A state. In the same manner, as illustrated in FIG. 7, when a read voltage is set between two adjacent states, it is determined that the memory cell MT having a threshold voltage lower than the read voltage belongs to the state that has a lower threshold voltage of the two states (or any state that has a still lower threshold voltage than the state).

<Processing Performed in Memory System>

Figure 8:
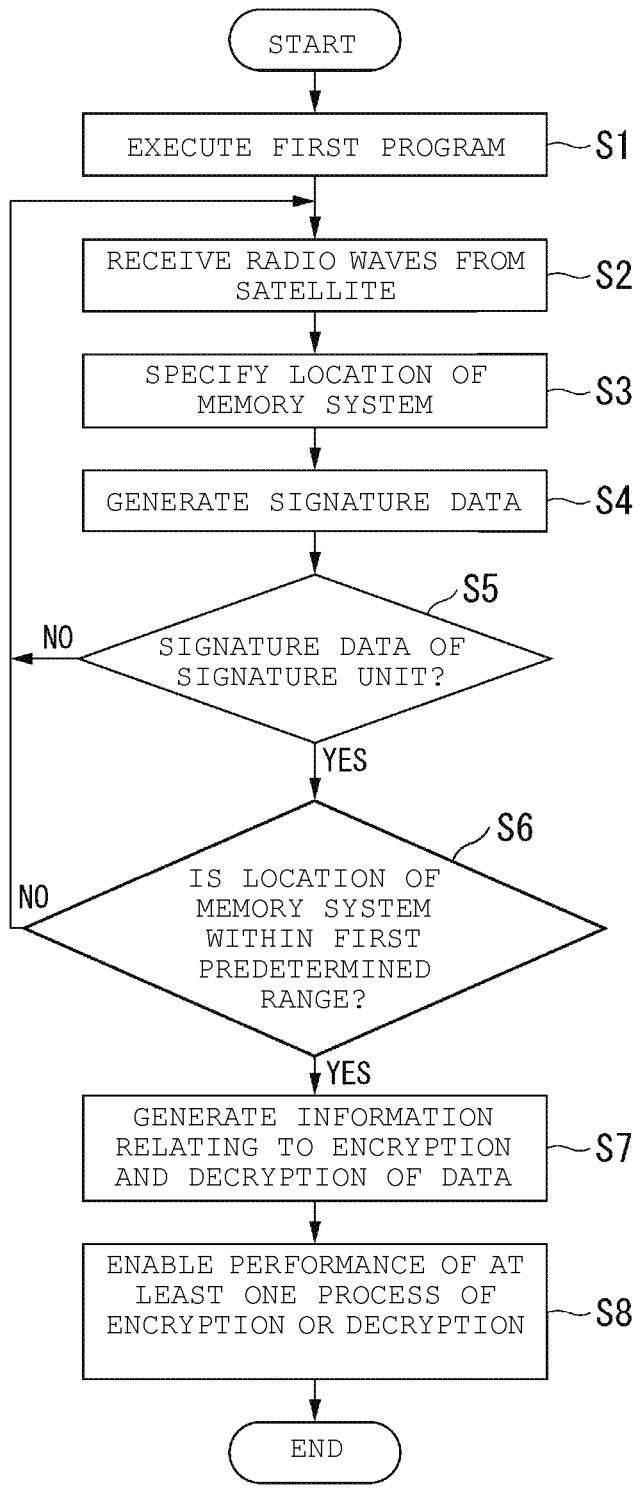
FIG. 8 is a diagram illustrating an example of a process flow of a memory system according to the first embodiment.

Subsequently, the process performed in the memory system 20a is described. FIG. 8 is a diagram illustrating an example of a process flow of the memory system 20a.

When the memory system 20a is booted, the CPU 2014 reads firmware from the NAND memory 202 or the ROM 2013 and loads the firmware into the RAM 2012. Also, the CPU 2014 executes a first program PG1 included in the firmware (Step S1). Here, the booting includes a state in which the electric power of the memory system 20a is switched from an OFF state to an ON state so that the memory system 20a can operate and a state in which the memory system 20a resets so that the memory system 20a can operate. The CPU 2014 executes the first program PG1 to cause the memory system 20a to be in a state of being able to receive an access request from the outside via the host device 20b.

Upon receiving an access request from the outside, the host device 20b outputs the access request to the memory system 20a. The CPU 2014 receives the access request via the host I/F controller 2011.

When the CPU 2014 receives an access request, the acquisition unit 204a receives radio waves from a satellite via the antenna 203 (Step S2).

The specifying unit 204b specifies the location of the memory system 20a based on the radio waves received by the acquisition unit 204a (Step S3). The signature unit 204c generates the predetermined signature data for the location data of the memory system 20a specified by the specifying unit 204b (Step S4). By this process by the signature unit 204c, thereafter, the falsification of the location data of the memory system 20a specified by the specifying unit 204b can be prevented.

The first determination unit 204d determines whether the signature data is the signature data of the signature unit 204c (Step S5). If it is determined that the signature data is not the signature data of the signature unit 204c (No in Step S5), the first determination unit 204d returns the process to Step S2.

If it is determined that the signature data is the signature data of the signature unit 204c (Yes in Step S5), the first determination unit 204d determines whether the location of the memory system 20a specified by the specifying unit 204b is within the first predetermined range (Step S6). The first determination unit 204d reads the information relating to the first predetermined range, for example, from the RAM 2012 of the memory controller 201. The first determination unit 204d compares the read first predetermined range and the location of the memory system 20a specified by the specifying unit 204b.

The generation unit 204e generates the information relating to the encryption and decryption used when encrypting and decrypting the data based on the location of the memory system 20a specified by the specifying unit 204b.

Specifically, if the first determination unit 204d determines that the location of the memory system 20a is outside the first predetermined range (No in Step S6), the generation unit 204e does not generate the information relating to the encryption and decryption of data and returns the process to Step S2.

If the first determination unit 204d determines that the location of the memory system 20a is within the first predetermined range (Yes in Step S6), the generation unit 204e generates information relating to the encryption and decryption of data (Step S7). The information relating to the encryption and decryption of data generated by the generation unit 204e may be different according to the location of the memory system 20a.

When the generation unit 204e generates the information relating to the encryption and decryption of data, the access processing unit 204f enables at least one of a process of encrypting data to be written to the NAND memory 202 by the CPU 2014 or a process of decrypting the data read from the NAND memory 202 by the CPU 2014, by using the information relating to the encryption and decryption of data generated by the generation unit 204e (Step S8).

<Advantage>

Hereinabove, the first information processing device 10 of the first embodiment has been described. In the first information processing device 10, the generation unit 204e generates the information relating to the encryption and decryption of data based on the location of the memory system 20a. The access processing unit 204f enables at least one of a process of encrypting data to be written to the NAND memory 202 by the CPU 2014 or a process of decrypting the data read from the NAND memory 202 by the CPU 2014, by using the information relating to the encryption and decryption of data generated by the generation unit 204e.

With such a configuration of the memory system 20a, a condition for accessing the data stored in the NAND memory 202 can be limited, so that when the condition is not satisfied, the information relating to the encryption and decryption of data is not generated. As a result, the possibility of the leakage of the data stored in the memory system 20a to the outside can be reduced by the first information processing device 10 of the first embodiment. That is, by the first information processing device 10 of the first embodiment, the confidentiality of the data in the memory system 20a can be improved.

In addition, the information relating to the encryption and decryption of data generated by the generation unit 204e may be different according to the location of the memory system 20a. In this manner, if the location of the memory system 20a when the data is read is different from the location of the memory system 20a when the data was written, the data cannot be correctly decrypted. As a result, the confidentiality of data in the memory system 20a can be improved.

First Modification of First Embodiment

Figure 9:
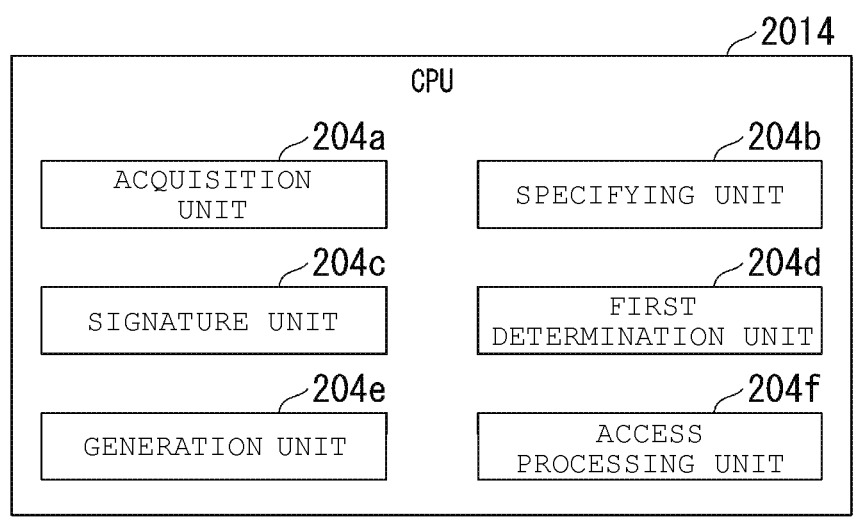
FIG. 9 is a diagram illustrating an example of a configuration of a CPU according to a first modification of the first embodiment.
Figure 10:
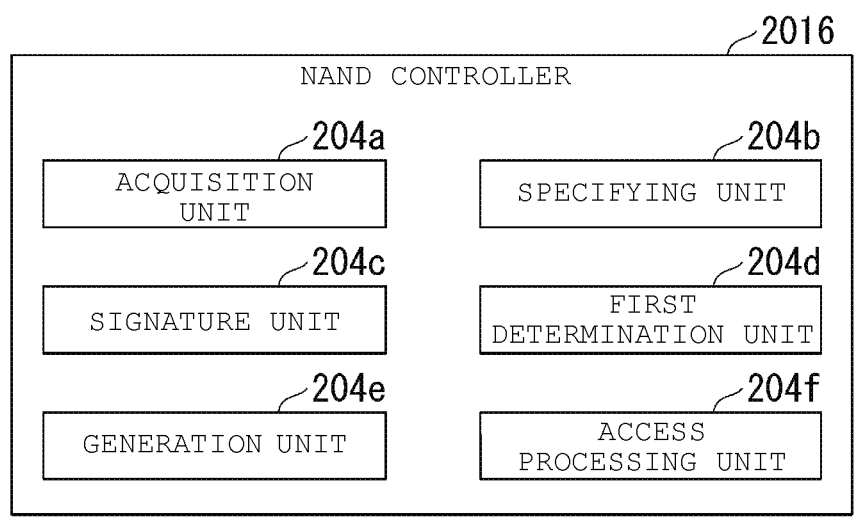
FIG. 10 is a diagram illustrating an example of a NAND controller according to the first modification of the first embodiment.
Figure 11:
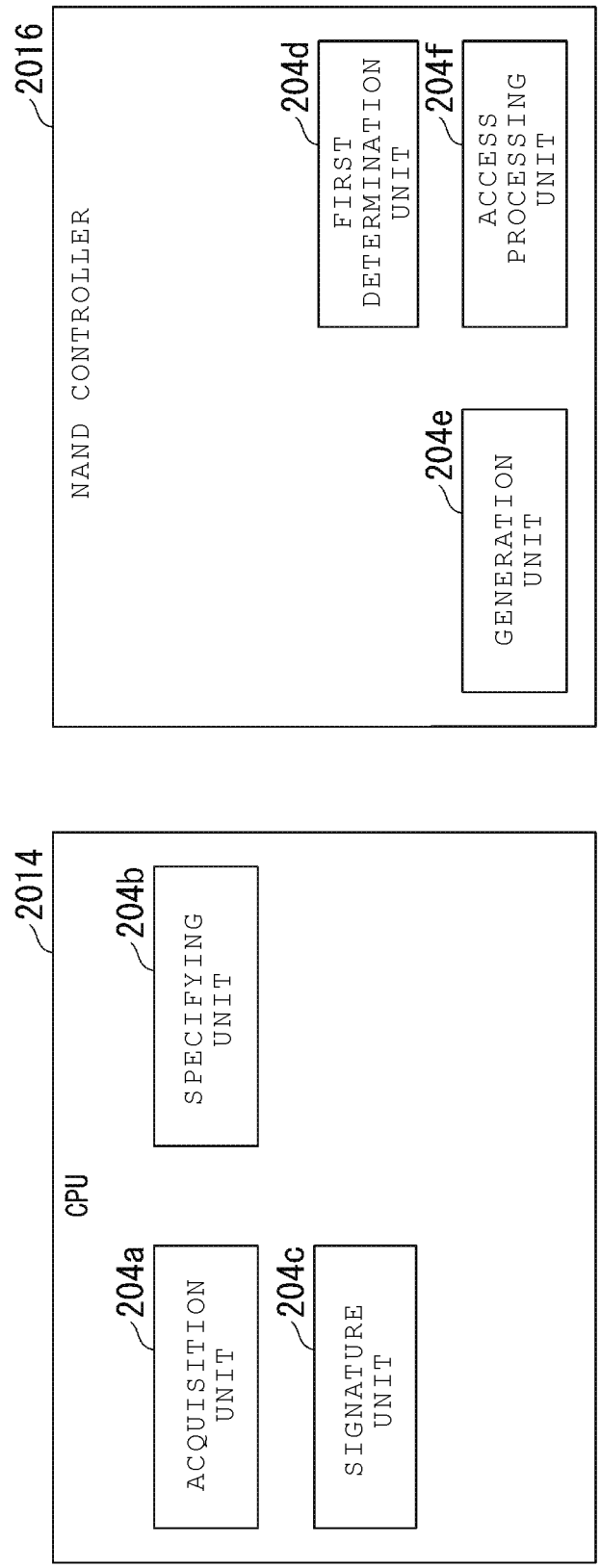
FIG. 11 is a diagram illustrating an example of a configuration of a CPU and a NAND controller according to the first modification of the first embodiment.

In the first embodiment described above, the description is made so that, in the memory system 20a, the communication processing device 204 is programmed or configured to function as the acquisition unit 204a, the specifying unit 204b, the signature unit 204c, the first determination unit 204d, the generation unit 204e, and the access processing unit 204f. However, according to a first modification of the first embodiment, in the memory system 20a, a part or all of the acquisition unit 204a, the specifying unit 204b, the signature unit 204c, the first determination unit 204d, the generation unit 204e, and the access processing unit 204f may be provided in the CPU 2014 or the NAND controller 2016. For example, as illustrated in FIG. 9, the CPU 2014 may include the functionality of all of the acquisition unit 204a, the specifying unit 204b, the signature unit 204c, the first determination unit 204d, the generation unit 204e, and the access processing unit 204f. In addition, for example, as illustrated in FIG. 10, the NAND controller 2016 may include the functionality of all of the acquisition unit 204a, the specifying unit 204b, the signature unit 204c, the first determination unit 204d, the generation unit 204e, and the access processing unit 204f. In addition, for example, as illustrated in FIG. 11, the CPU 2014 may include the functionality of the acquisition unit 204a, the specifying unit 204b, and the signature unit 204c, and the NAND controller 2016 may include the functionality of the first determination unit 204d, the generation unit 204e, and the access processing unit 204f.

Second Modification of First Embodiment

Figure 12:
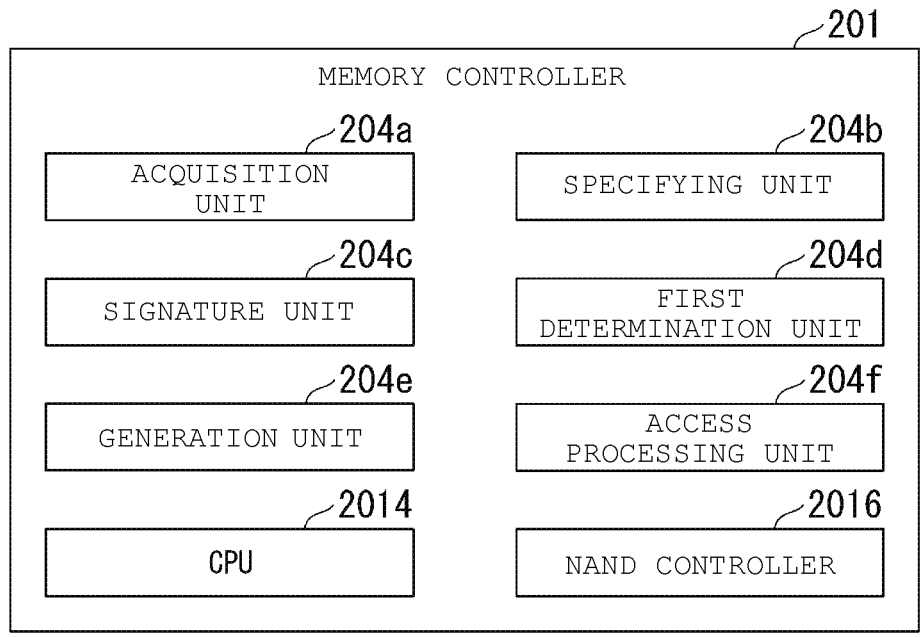
FIG. 12 is a diagram illustrating an example of a configuration of a memory controller according to a second modification of the first embodiment.

According to a second modification of the first embodiment, in the memory system 20a, the functionality of a part or all of the acquisition unit 204a, the specifying unit 204b, the signature unit 204c, the first determination unit 204d, the generation unit 204e, and the access processing unit 204f may be provided in the memory controller 201, independently from the communication processing device 204, the CPU 2014, and the NAND controller 2016. For example, as illustrated in FIG. 12, the memory controller 201 may include the functionality of all of the acquisition unit 204a, the specifying unit 204b, the signature unit 204c, the first determination unit 204d, the generation unit 204e, and the access processing unit 204f, independently from the communication processing device 204, the CPU 2014, and the NAND controller 2016. Note that, in FIG. 12, the descriptions of the host interface controller 2011, the RAM 2012, the ROM 2013, and the ECC circuit 2015 are omitted.

Second Embodiment

When the memory system 20a is booted, in the first information processing device 10 of the second embodiment, it is determined whether to execute the first program PG1 included in firmware FW1 based on the location of the memory system 20a.

<Configuration of Communication Processing Device>

Figure 13:
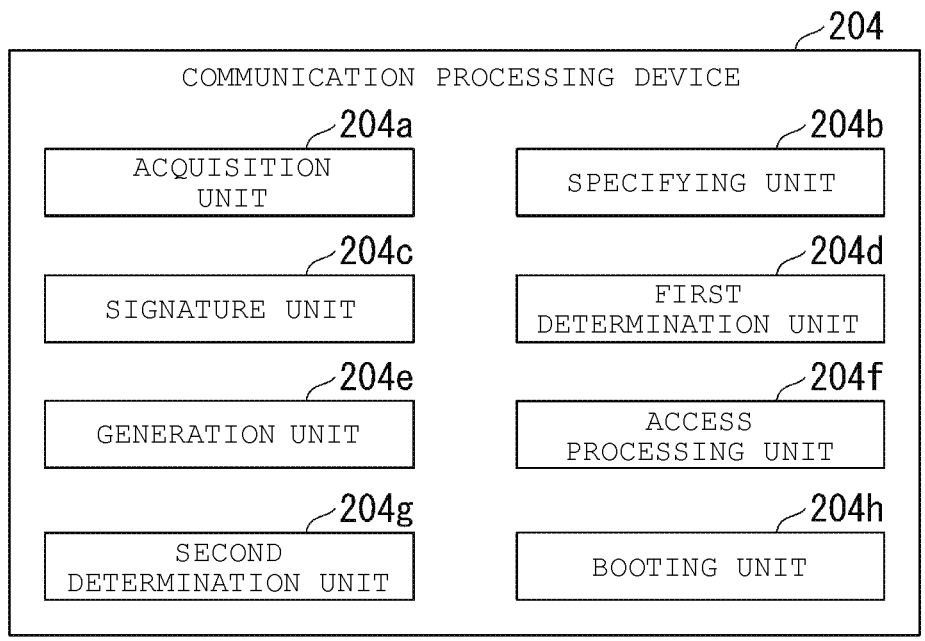
FIG. 13 is a diagram illustrating an example of a configuration of a communication processing device of a second embodiment.

FIG. 13 is a diagram illustrating an example of a configuration of the communication processing device 204. The communication processing device 204 is programmed or configured to function as a second determination unit 204g and a booting unit 204h in addition to the acquisition unit 204a, the specifying unit 204b, the signature unit 204c, the first determination unit 204d, the generation unit 204e, and the access processing unit 204f.

The second determination unit 204g determines whether to execute the first program PG1 based on the location of the memory system 20a.

For example, if the first determination unit 204d determines that the location of the memory system 20a is within the first predetermined range, the second determination unit 204g determines to execute the first program PG1. In addition, if the first determination unit 204d determines that the location of the memory system 20a is outside the first predetermined range, the second determination unit 204g determines not to execute the first program PG1.

Based on the determination result of the second determination unit 204g, the booting unit 204h causes the CPU 2014 of the memory controller 201 to execute the first program PG1.

For example, if the second determination unit 204g determines to execute the first program PG1, the booting unit 204h causes the CPU 2014 to execute the first program PG1. In addition, if the second determination unit 204g determines not to execute the first program PG1, the booting unit 204h does not cause the CPU 2014 to execute the first program PG1.

<Process Performed in Memory System>

Figure 14:
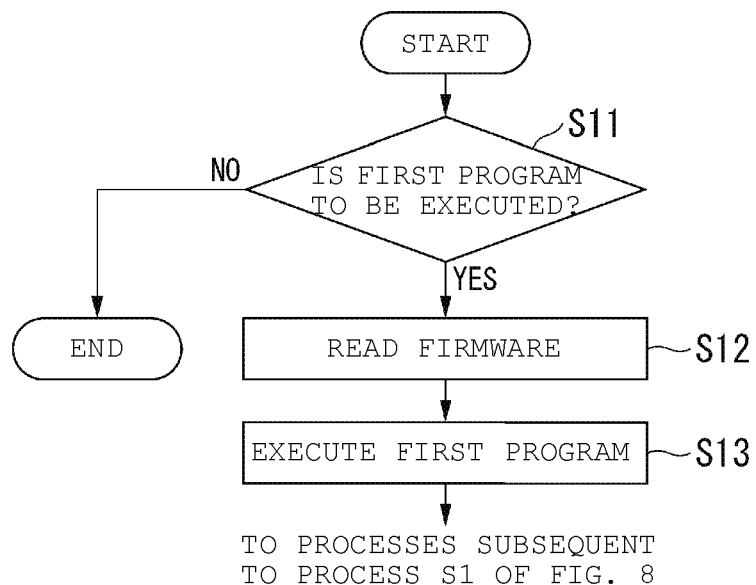
FIG. 14 is a diagram illustrating an example of a process flow of a memory system according to the second embodiment.

Subsequently, the process performed in the memory system 20a is described. FIG. 14 is a diagram illustrating an example of a process flow of the memory system 20a.

When the memory system 20a is booted, the second determination unit 204g of the communication processing device 204 determines whether to execute the first program PG1 based on the location of the memory system 20a (Step S11). Specifically, if the first determination unit 204d determines that the location of the memory system 20a is within the first predetermined range, the second determination unit 204g determines to execute the first program PG1. In addition, if the first determination unit 204d determines that the location of the memory system 20a is outside the first predetermined range, the second determination unit 204g determines not to execute the first program PG1.

If the second determination unit 204g determines to execute the first program PG1 (Yes in Step S11), the booting unit 204h causes the CPU 2014 of the memory controller 201 to read the firmware from the ROM 2013 (Step S12). Also, the CPU 2014 executes the first program PG1 included in the firmware (Step S13). In this process of Step S13, the memory system 20a enters a state of being able to receive an access request from the outside. The memory system 20a becomes ready to execute the processes subsequent to Step S1 illustrated in FIG. 8.

If it is determined not to execute the first program PG1 (No in Step S11), the second determination unit 204g ends the process.

<Advantage>

In the above, the first information processing device 10 of the second embodiment has been described. In the memory system 20a of the first information processing device 10, the second determination unit 204g determines whether to execute the first program PG1 based on the location of the memory system 20a. The booting unit 204h causes the CPU 2014 to execute the first program PG1 based on the determination result of the second determination unit 204g.

In the first information processing device 10 of the first embodiment, the host device 20b can issue a command to the memory system 20a regardless of the location of the memory system 20a. For example, if the location of the memory system 20a is not within the first predetermined range, encrypted data cannot be read and new data cannot be written. However, the memory system 20a can receive the other command from the host device 20b even if the location thereof is not within the first predetermined range. On the other hand, in the first information processing device 10 of the second embodiment, according to the location of the memory system 20a, the command issuance itself from the host device 20b to the memory system 20a can be disabled. For example, if the location of the memory system 20a is not within the first predetermined range, even the recognition of the memory system 20a by the host device 20b can be disabled. As a result, the first information processing device 10 of the second embodiment can further reduce the possibility of the leakage of the data stored in the memory system 20a to the outside, than the first information processing device 10 of the first embodiment. That is, the first information processing device 10 of the second embodiment can further improve the confidentiality of the data in the memory system 20a than the first information processing device 10 of the first embodiment.

First Modification of Second Embodiment

Figure 15:
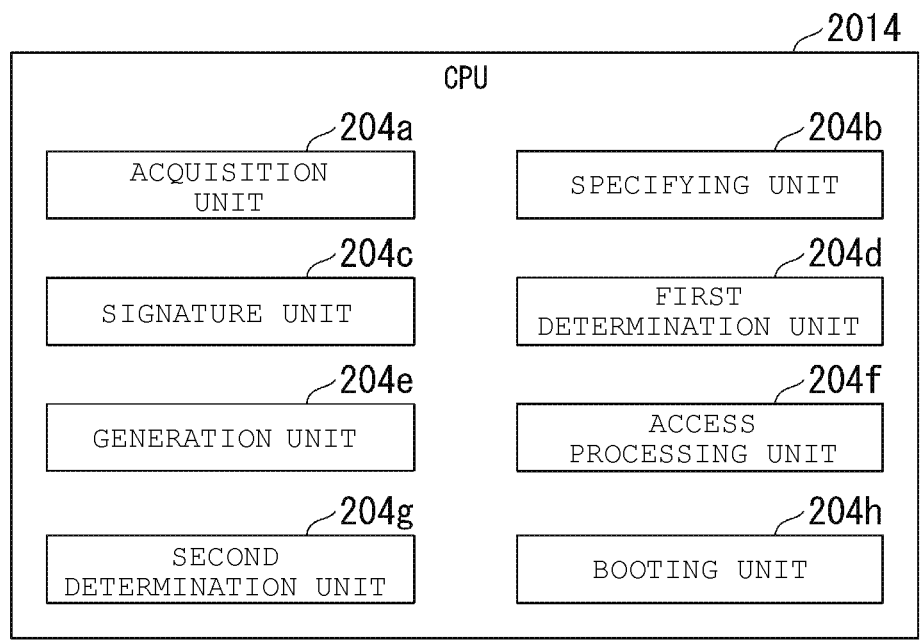
FIG. 15 is a diagram illustrating an example of a configuration of a CPU according to a first modification of the second embodiment.
Figure 16:
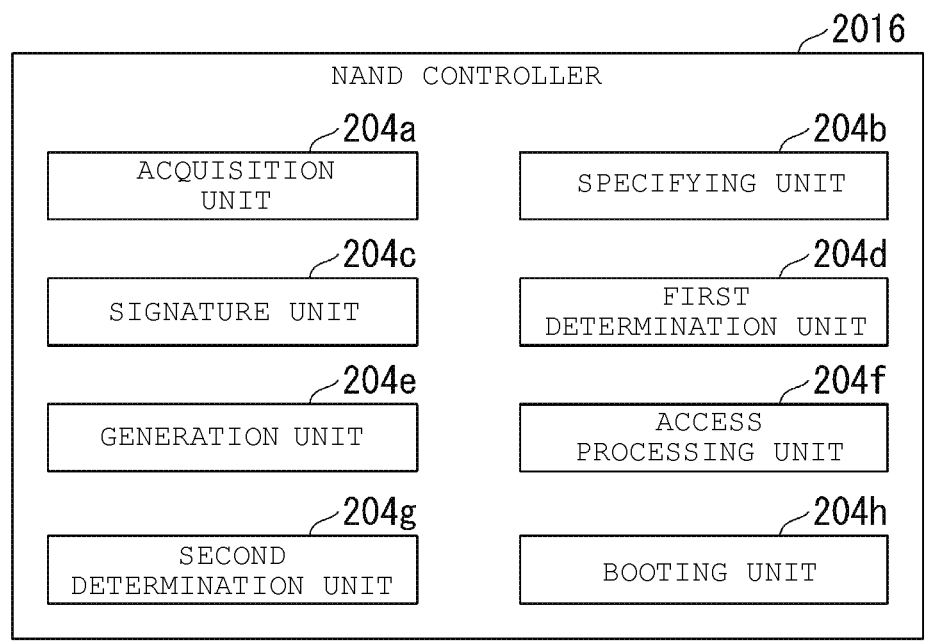
FIG. 16 is a diagram illustrating an example of a configuration of a NAND controller according to the first modification of the second embodiment.
Figure 17:
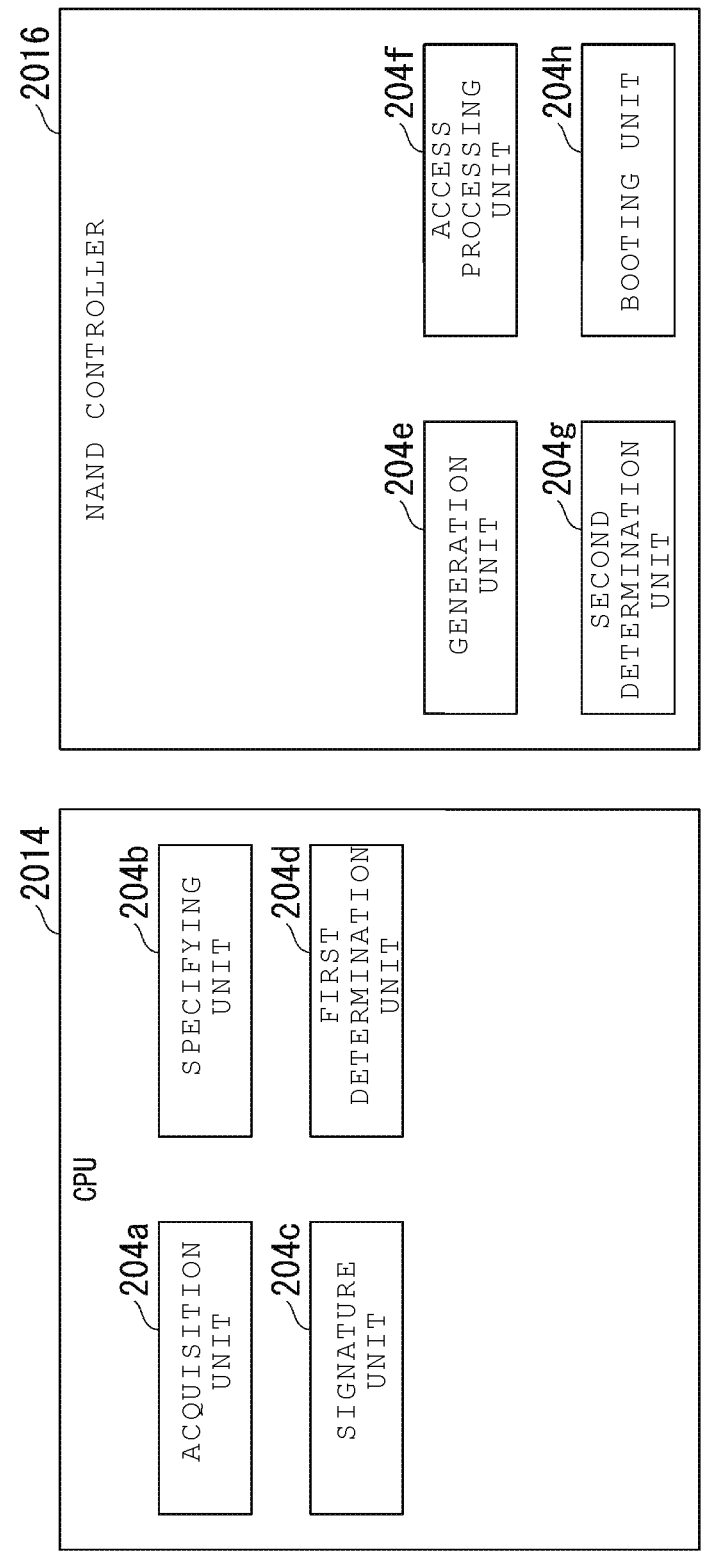
FIG. 17 is a diagram illustrating an example of a configuration of a CPU and a NAND controller according to the first modification of the second embodiment.

According to the above second embodiment, the description is made so that, in the memory system 20a, the communication processing device 204 is programmed or configured to function as the acquisition unit 204a, the specifying unit 204b, the signature unit 204c, the first determination unit 204d, the generation unit 204e, the access processing unit 204f, the second determination unit 204g, and the booting unit 204h. However, according to a first modification of the second embodiment, in the memory system 20a, the functionality of a part or all of the acquisition unit 204a, the specifying unit 204b, the signature unit 204c, the first determination unit 204d, the generation unit 204e, the access processing unit 204f, the second determination unit 204g, and the booting unit 204h may be provided in the CPU 2014 or the NAND controller 2016. For example, as illustrated in FIG. 15, the CPU 2014 may include the functionality of all of the acquisition unit 204a, the specifying unit 204b, the signature unit 204c, the first determination unit 204d, the generation unit 204e, the access processing unit 204f, the second determination unit 204g, and the booting unit 204h. In addition, for example, as illustrated in FIG. 16, the NAND controller 2016 may include the functionality of all of the acquisition unit 204a, the specifying unit 204b, the signature unit 204c, the first determination unit 204d, the generation unit 204e, the access processing unit 204f, the second determination unit 204g, and the booting unit 204h. In addition, for example, as illustrated in FIG. 17, the CPU 2014 may include the functionality of the acquisition unit 204a, the specifying unit 204b, the signature unit 204c, and the first determination unit 204d, and the NAND controller 2016 may include the functionality of the generation unit 204e, the access processing unit 204f, the second determination unit 204g, and the booting unit 204h.

Second Modification of Second Embodiment

Figure 18:
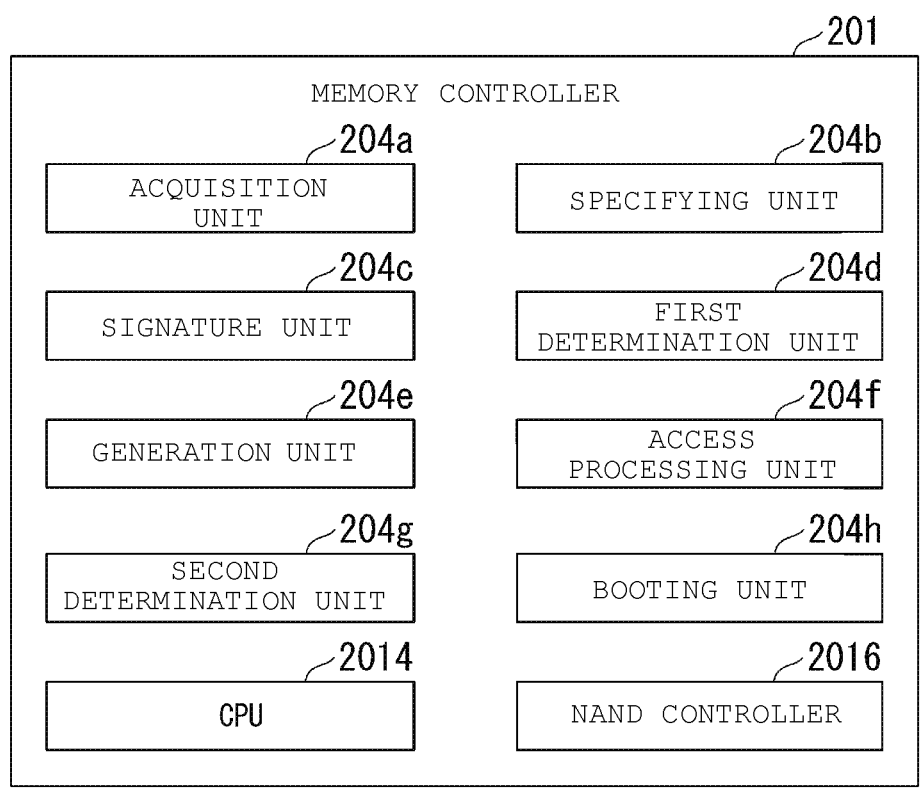
FIG. 18 is a diagram illustrating an example of a configuration of a memory controller according to a second modification of the second embodiment.

In a second modification of the second embodiment, in the memory system 20a, the functionality of a part or all of the acquisition unit 204a, the specifying unit 204b, the signature unit 204c, the first determination unit 204d, the generation unit 204e, the access processing unit 204f, the second determination unit 204g, and the booting unit 204h may be provided in the memory controller 201, independently from the communication processing device 204, the CPU 2014, and the NAND controller 2016. For example, as illustrated in FIG. 18, the memory controller 201 may include the functionality of all of the acquisition unit 204a, the specifying unit 204b, the signature unit 204c, the first determination unit 204d, the generation unit 204e, the access processing unit 204f, the second determination unit 204g, and the booting unit 204h, independently from the communication processing device 204, the CPU 2014, and the NAND controller 2016. Note that, in FIG. 18, the descriptions of the host interface controller 2011, the RAM 2012, the ROM 2013, and the ECC circuit 2015 are omitted.

Third Embodiment

<Configuration of Information Processing System>

Figure 19:
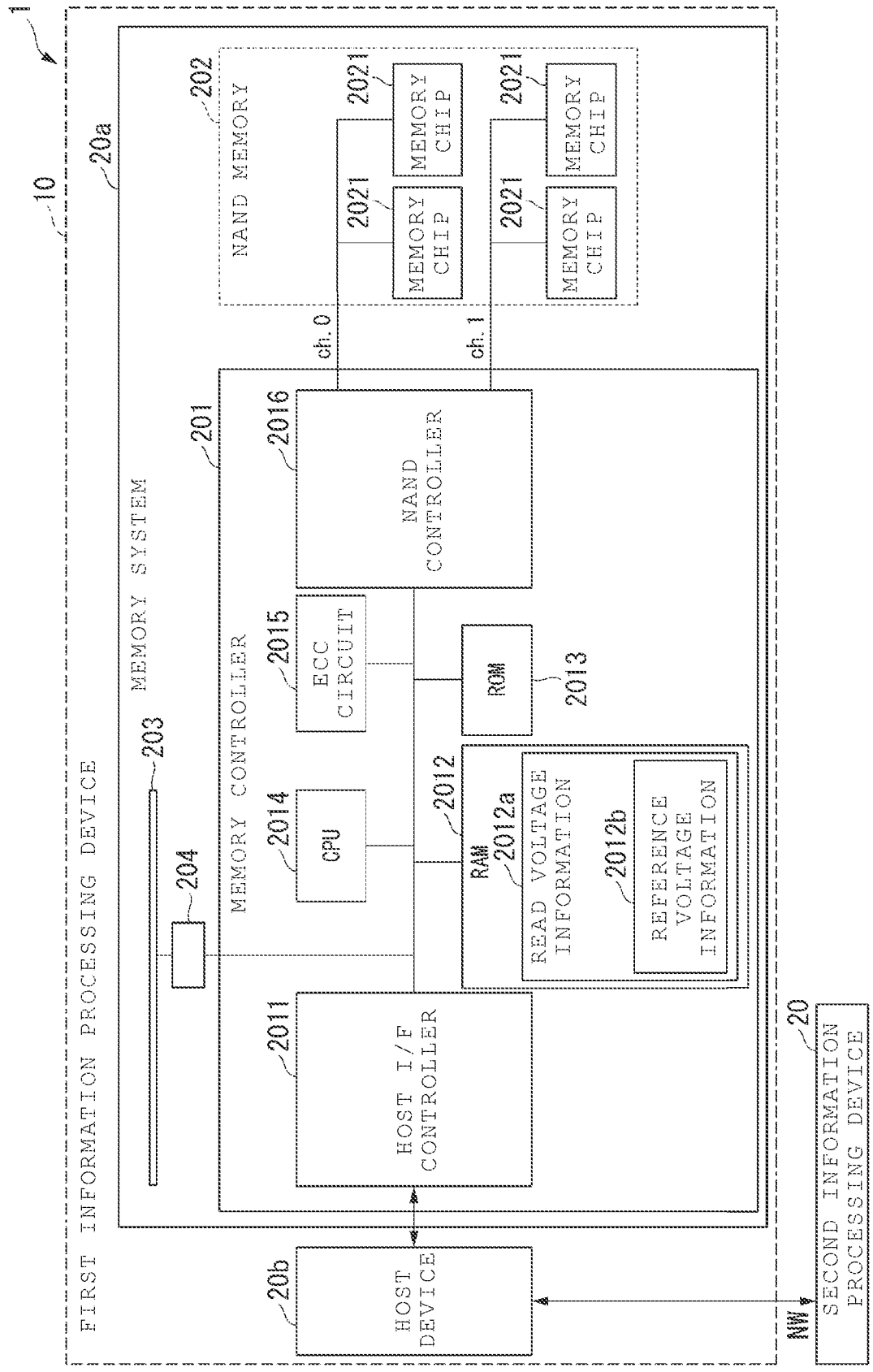
FIG. 19 is a diagram illustrating an example of a configuration of an information processing system according to a third embodiment.

FIG. 19 is a diagram illustrating an example of a configuration of an information processing system 1 according to a third embodiment. As illustrated in FIG. 19, the information processing system 1 includes the first information processing device 10 and a second information processing device 20, which is an example of an external device. The first information processing device 10 may be connected to the second information processing device 20 via a network NW. In the information processing system 1 according to the third embodiment, if the memory system 20a receives an access request from the second information processing device 20, it is determined whether the memory system 20a generates information relating to the encryption and decryption of data, based on the location data of the second information processing device 20 transmitted from the second information processing device 20 together with the request.

<Configuration of Second Information Processing Device>

Figure 20:
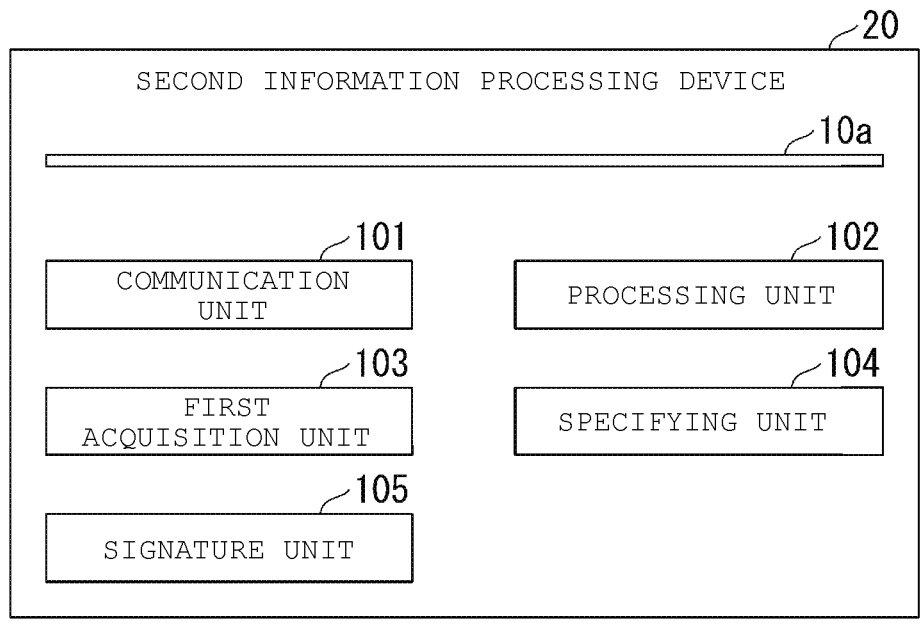
FIG. 20 is a diagram illustrating an example of a configuration of a second information processing device of the third embodiment.

FIG. 20 is a diagram illustrating an example of a configuration of the second information processing device 20. The second information processing device 20 is a device for accessing data stored in the first information processing device 10. The second information processing device 20 is, for example, a mobile-type information processing terminal such as a laptop PC. As illustrated in FIG. 20, the second information processing device 20 includes a communication unit 101, a processing unit 102, a first acquisition unit 103, a specifying unit 104, and a signature unit 105. The communication unit 101, the processing unit 102, the first acquisition unit 103, the specifying unit 104, and the signature unit 105 may be implemented by one or a plurality of integrated circuits such as a central processing unit (CPU), a field programmable gate array (FPGA), and an application specific integrated circuit (ASIC). In addition, the second information processing device 20 includes an antenna 10a.

The communication unit 101 communicates with the memory system 20a via the host device 20b in the first information processing device 10.

The processing unit 102 attempts a process of writing data to the memory system 20a or a process of reading data from the memory system 20a, via the communication unit 101.

The first acquisition unit 103 receives radio waves from a satellite via the antenna 10a.

The specifying unit 104 specifies the location of the second information processing device 20 based on the radio waves received by the first acquisition unit 103. For example, the specifying unit 104 specifies the location of the second information processing device 20 in the same manner as in the method of specifying the location of the memory system 20a by using the GPS by the specifying unit 204b in the first embodiment. That is, the specifying unit 104 specifies the location of the second information processing device 20 based on the radio waves received respectively from four different satellites by the first acquisition unit 103. The location may be indicated by latitude and longitude. However, the location may be indicated by an altitude in addition to the latitude and the longitude.

The signature unit 105 generates predetermined signature data for the location data of the second information processing device 20 to be transmitted to the first information processing device 10 together with an access request. For example, the signature unit 105 generates the predetermined signature data for the location data by using a private key based on the RSA algorithm. The private key is stored in a hardware security module device such as a universal serial bus (USB) dongle. Also, the signature unit 105 transmits the location data to which the signature data is added to the first information processing device 10, together with the access request.

<Configuration of Communication Processing Device>

Figure 21:
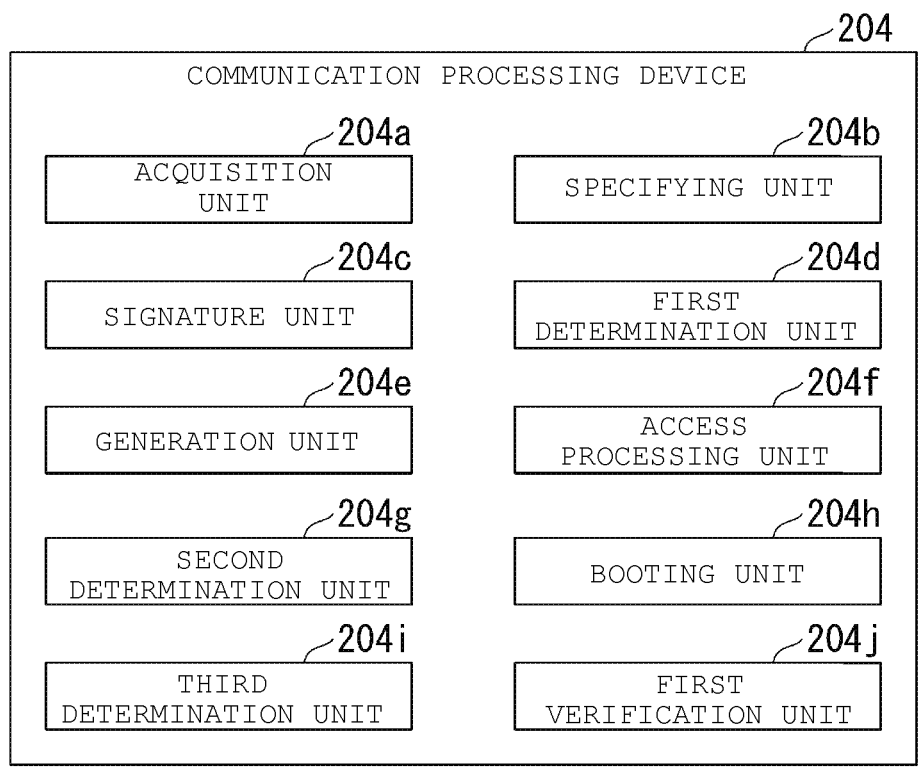
FIG. 21 is a diagram illustrating an example of a configuration of a communication processing device of the third embodiment.

FIG. 21 is a diagram illustrating an example of a configuration of the communication processing device 204 in the first information processing device 10. The communication processing device 204 is programmed or configured to function as a third determination unit 204i and a first verification unit 204j in addition to the acquisition unit 204a, the specifying unit 204b, the signature unit 204c, the first determination unit 204d, the generation unit 204e, the access processing unit 204f, the second determination unit 204g, and the booting unit 204h.

The third determination unit 204i determines whether the signature data is the signature data of the second information processing device 20, by using a predetermined public key. The predetermined public key is paired with the private key used for generating the signature data by the second information processing device 20. That is, the predetermined public key is a public key for decrypting the signature data into data that can be read by the third determination unit 204i.

If the third determination unit 204i determines that the signature data is the signature data of the second information processing device 20, the first verification unit 204j continues the process of the memory system 20a. In addition, if the third determination unit 204i determines that the signature data is not the signature data of the second information processing device 20, the first verification unit 204j ends the process of the memory system 20a.

Figures 22, 23:
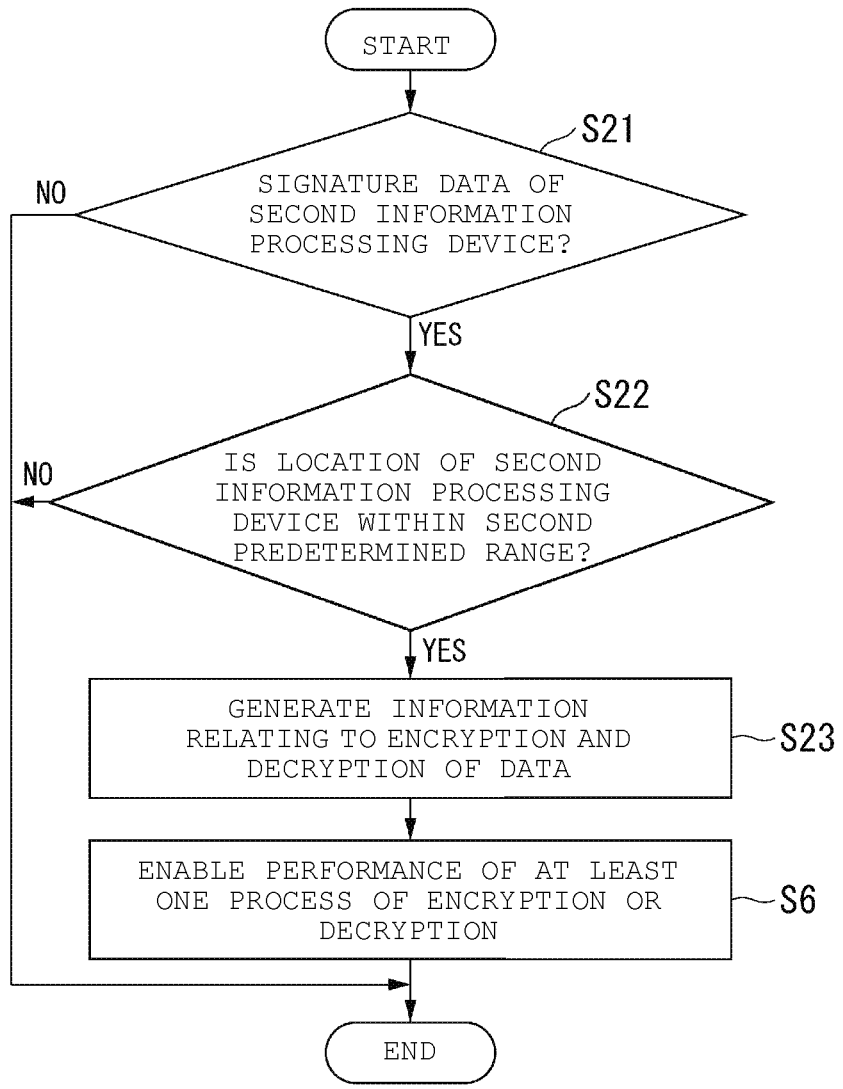
FIG. 22 is a diagram illustrating an example of a second predetermined range according to the third embodiment.
FIG. 23 is a diagram illustrating an example of a process flow of a memory system according to the third embodiment.

If the third determination unit 204i determines that the signature data is the signature data of the second information processing device 20, the first verification unit 204j verifies whether the location of the second information processing device 20 indicated by the location data of the second information processing device 20 received from the second information processing device 20 is within a second predetermined range. The second predetermined range is set as a location of the second information processing device 20 in which the second information processing device 20 is permitted to access the memory system 20a. This second predetermined range is loaded from the memory chip 2021 to the RAM 2012, for example, at the time of the operation start of the memory system 20a. FIG. 22 is a diagram illustrating an example of the second predetermined range. In FIG. 22, with respect to the latitude and the longitude in which the second information processing device 20 is permitted to access the memory system 20a, the allowable range of the latitude and the allowable range of the longitude are defined to indicate the second predetermined range. The first verification unit 204j reads the information relating to the second predetermined range written in the RAM 2012. The first verification unit 204j can verify whether the location of the second information processing device 20 is within the second predetermined range, by comparing the read second predetermined range and the location data of the second information processing device 20 received from the second information processing device 20.

If the first verification unit 204j verifies that the location of the second information processing device 20 is within the second predetermined range, the generation unit 204e generates the information relating to the encryption and decryption of data.

For example, if a write request of data is received from the second information processing device 20, the host device 20b outputs the write request to the memory system 20a. When the CPU 2014 receives the write request via the host I/F controller 2011 and the first verification unit 204j verifies that the location of the second information processing device 20 is within the second predetermined range, the generation unit 204e generates the encryption key based on the location of the memory system 20a. In addition, if the first verification unit 204j verifies that the location of the second information processing device 20 is not within the second predetermined range, the generation unit 204e does not generate the encryption key.

For example, if a read request of data is received from the second information processing device 20, the host device 20b outputs the read request to the memory system 20a. When the CPU 2014 receives the read request via the host I/F controller 2011 and the first verification unit 204j verifies that the location of the second information processing device 20 is within the second predetermined range, the generation unit 204e generates the decryption key based on the location of the memory system 20a. In addition, if the first verification unit 204j verifies that the location of the second information processing device 20 is not within the second predetermined range, the generation unit 204e does not generate the decryption key.

When the generation unit 204e generates the information relating to the encryption and decryption of data, the access processing unit 204f enables at least one of a process of encrypting data to be written to the NAND memory 202 by the CPU 2014 or a process of decrypting the data read from the NAND memory 202 by the CPU 2014, by using the information relating to the encryption and decryption of data generated by the generation unit 204e.

For example, if the generation unit 204e generates the encryption key, the access processing unit 204f transmits the encryption key generated by the generation unit 204e to the memory controller 201. The CPU 2014 of the memory controller 201 encrypts the write data to be written to the NAND memory 202 by using the encryption key. Also, the NAND controller 2016 of the memory controller 201 writes the encrypted data to the NAND memory 202.

In addition, for example, if the generation unit 204e generates the decryption key, the access processing unit 204f transmits the decryption key generated by the generation unit 204e to the memory controller 201. The NAND controller 2016 of the memory controller 201 reads the encrypted data from the NAND memory 202. Also, the CPU 2014 of the memory controller 201 decrypts the encrypted data read from the NAND memory 202 by using the decryption key generated by the generation unit 204e.

<Process Performed in Memory System>

Subsequently, the process performed in the memory system 20a is described. FIG. 23 is a diagram illustrating an example of a process flow of the memory system 20a.

The second information processing device 20 transmits the location data to which the signature data is added to the host device 20b, together with an access request. The host device 20b transmits the location data to which the signature data is added to the memory system 20a, together with the access request.

The third determination unit 204i of the communication processing device 204 determines whether the signature data is the signature data of the second information processing device 20 by using the predetermined public key (Step S21).

If it is determined that the signature data is not the signature data of the second information processing device 20 (No in Step S21), the third determination unit 204i ends the process.

If the third determination unit 204i determines that the signature data is the signature data of the second information processing device 20 (Yes in Step S21), the first verification unit 204j verifies whether the location of the second information processing device 20 indicated by the location data of the second information processing device 20 received from the second information processing device 20 is within the second predetermined range (Step S22).

Specifically, the first verification unit 204j reads the information relating to the second predetermined range written in the RAM 2012. Also, the first verification unit 204j compares the read second predetermined range and the location data of the second information processing device 20 received from the second information processing device 20.

If the first verification unit 204j verifies that the location of the second information processing device 20 is not within the second predetermined range (No in Step S22), the process ends.

If the first verification unit 204j verifies that the location of the second information processing device 20 is within the second predetermined range (Yes in Step S22), the generation unit 204e generates the information relating to the encryption and decryption of data (Step S23).

Specifically, if the first verification unit 204j verifies that the location of the second information processing device 20 is within the second predetermined range, the generation unit 204e generates the encryption key based on the location of the memory system 20a. The encryption key is an example of the information relating to the encryption and decryption of data. If the first verification unit 204j verifies that the location of the second information processing device 20 is not within the second predetermined range, the generation unit 204e does not generate the encryption key.

Specifically, if the first verification unit 204j verifies that the location of the second information processing device 20 is within the second predetermined range, the generation unit 204e generates the decryption key based on the location of the memory system 20a. The decryption key is an example of the information relating to the encryption and decryption of data. In addition, if the first verification unit 204j verifies that the location of the second information processing device 20 is not within the second predetermined range, the generation unit 204e does not generate the decryption key.

If the generation unit 204e generates the information relating to the encryption and decryption of data, the access processing unit 204f enables at least one of a process of encrypting data to be written to the NAND memory 202 by the CPU 2014 or a process of decrypting the data read from the NAND memory 202 by the CPU 2014, by using the information relating to the encryption and decryption of data generated by the generation unit 204e (Step S6).

<Advantage>

In the above, the information processing system 1 according to the third embodiment has been described. In the memory system 20a of the information processing system 1, if the third determination unit 204i determines that the signature data is the signature data of the second information processing device 20, the first verification unit 204j verifies whether the location of the second information processing device 20 indicated by the location data of the second information processing device 20 received from the second information processing device 20 is within the second predetermined range.

With such a configuration of the memory system 20a, it is possible to determine the presence or absence of the falsification to the location data of the second information processing device 20 transmitted from the second information processing device 20 to the memory system 20a. Accordingly, in the first information processing device 10 in the information processing system 1 according to the third embodiment, the condition for accessing the data stored in the memory system 20a can be further limited as compared with the first information processing device 10 of the first to second embodiments. If this condition is not satisfied, the information relating to the encryption and decryption of data is not generated, and thus the data stored in the memory system 20a is not accessible. As a result, in the first information processing device 10 of the third embodiment, the possibility of the leakage of the data stored in the memory system 20a to the outside can be further reduced as compared with the first information processing device 10 of the first to second embodiments. That is, the first information processing device of the third embodiment can further improve the confidentiality of the data in the memory system 20a than the first information processing device 10 of the first to second embodiments.

First Modification of Third Embodiment

Figure 24:
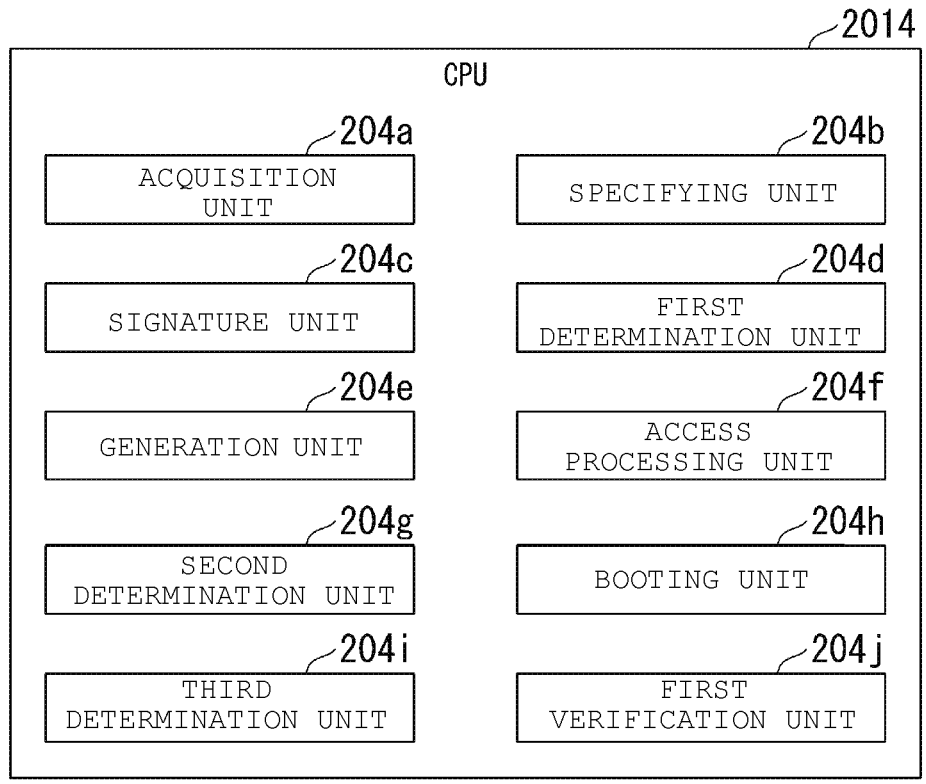
FIG. 24 is a diagram illustrating an example of a configuration of a CPU according to a first modification of the third embodiment.
Figure 25:
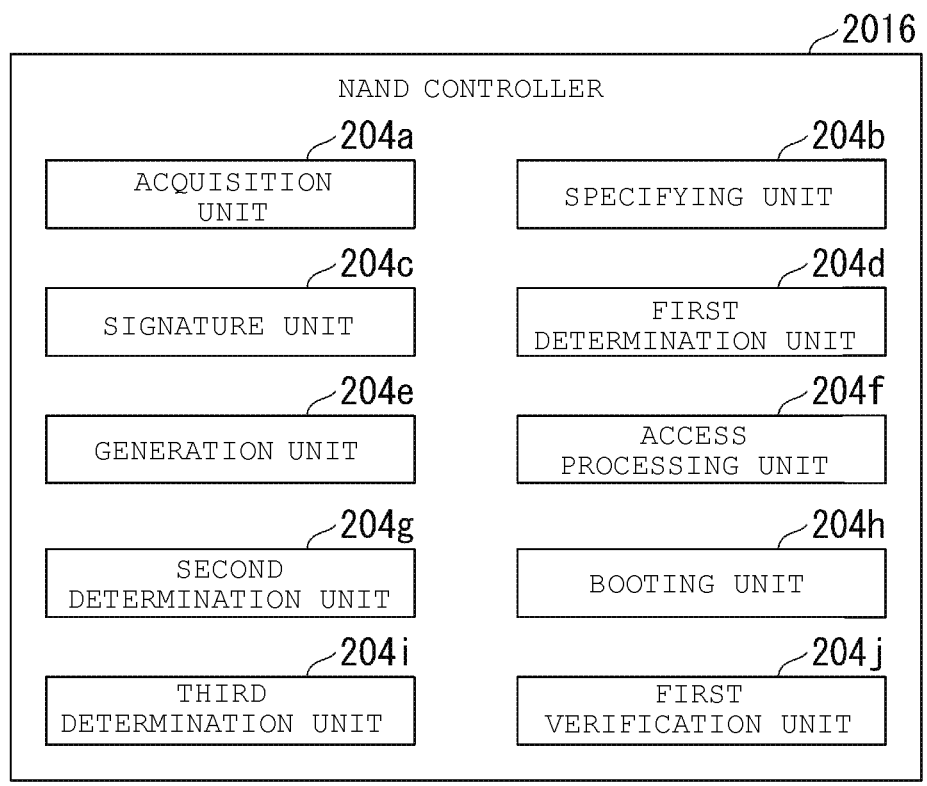
FIG. 25 is a diagram illustrating an example of a configuration of a NAND controller according to the first modification of the third embodiment.
Figure 26:
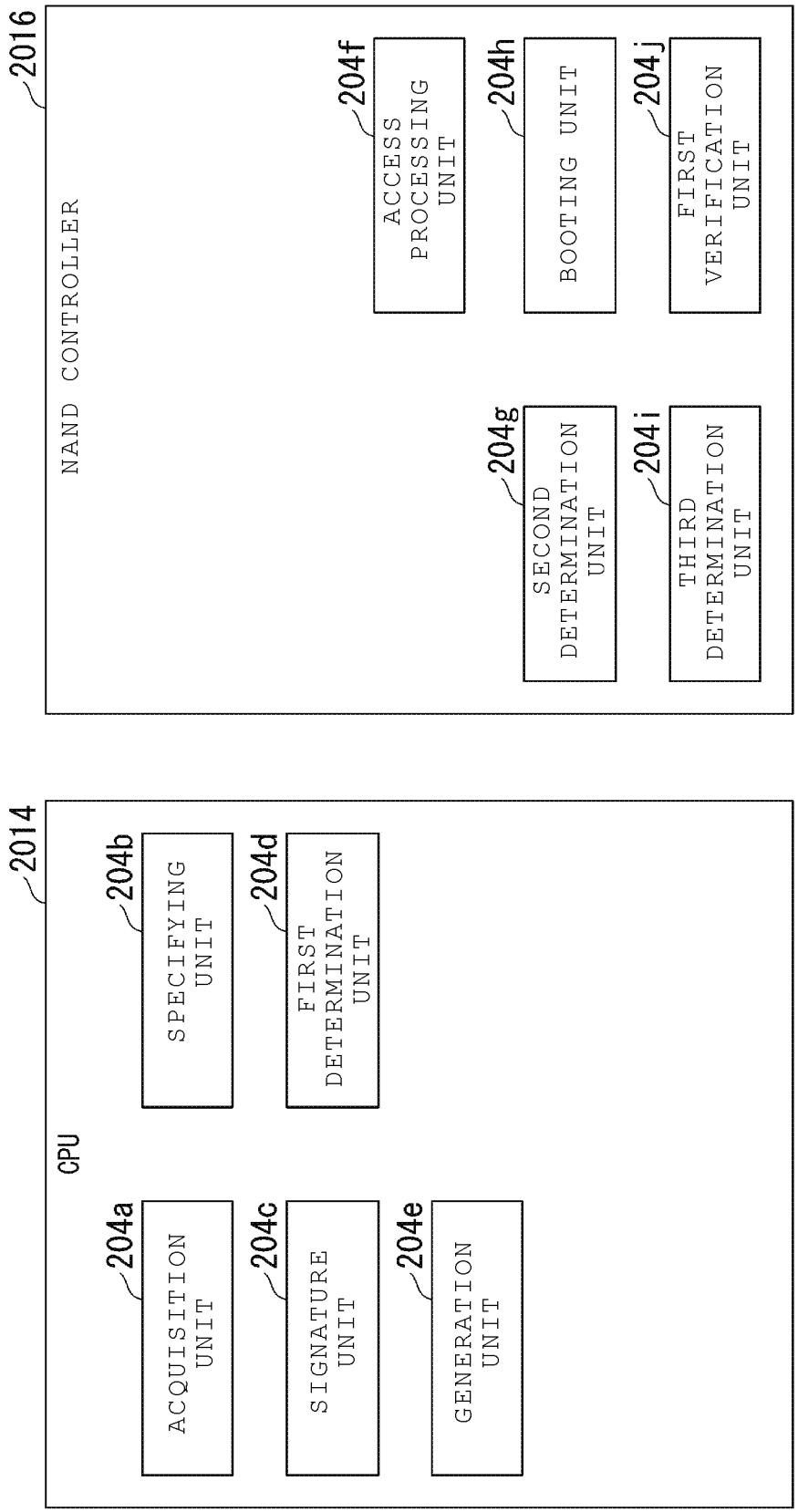
FIG. 26 is a diagram illustrating an example of a configuration of a CPU and a NAND controller according to the first modification of the third embodiment.

According to the above third embodiment, the description is made so that, in the memory system 20a, the communication processing device 204 is programmed or configured to function as the acquisition unit 204a, the specifying unit 204b, the signature unit 204c, the first determination unit 204d, the generation unit 204e, the access processing unit 204f, the second determination unit 204g, the booting unit 204h, the third determination unit 204i, and the first verification unit 204j. However, according to a first modification of the third embodiment, in the memory system 20a, the functionality of a part or all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, and the first verification unit 204j may be provided in the CPU 2014 or the NAND controller 2016. For example, as illustrated in FIG. 24, the CPU 2014 may include the functionality of all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, and the first verification unit 204j. In addition, for example, as illustrated in FIG. 25, the NAND controller 2016 may include the functionality of all of the acquisition unit 204a, the specifying unit 204*b*, the signature unit 204*c*, the first determination unit 204*d*, the generation unit 204*e*, the access processing unit 204*f*, the second determination unit 204*g*, the booting unit 204*h*, the third determination unit 204*i*, and the first verification unit 204*j*. In addition, for example, as illustrated in FIG. 26, the CPU 2014 may include the functionality of the acquisition unit 204*a*, the specifying unit 204*b*, the signature unit 204*c*, the first determination unit 204*d*, and the generation unit 204*e*, and the NAND controller 2016 may include the functionality of the access processing unit 204*f*, the second determination unit 204*g*, the booting unit 204*h*, the third determination unit 204*i*, and the first verification unit 204*j*.

Second Modification of Third Embodiment

Figure 27:
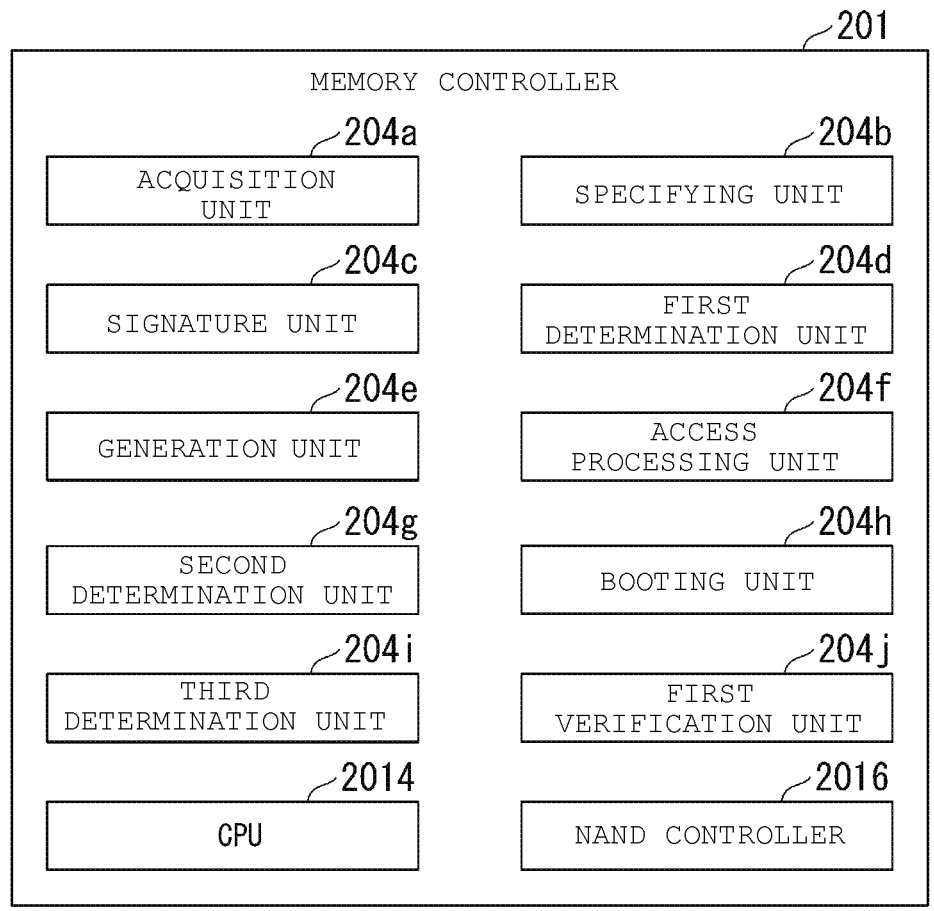
FIG. 27 is a diagram illustrating an example of a configuration of a memory controller according to a second modification of the third embodiment.

According to a second modification of the third embodiment, in the memory system 20*a*, the functionality of a part or all of the acquisition unit 204*a*, the specifying unit 204*b*, the signature unit 204*c*, the first determination unit 204*d*, the generation unit 204*e*, the access processing unit 204*f*, the second determination unit 204*g*, the booting unit 204*h*, the third determination unit 204*i*, and the first verification unit 204*j* are provided in the memory controller 201, independently from the communication processing device 204, the CPU 2014, and the NAND controller 2016. For example, as illustrated in FIG. 27, the memory controller 201 may include the functionality of all of the acquisition unit 204*a*, the specifying unit 204*b*, the signature unit 204*c*, the first determination unit 204*d*, the generation unit 204*e*, the access processing unit 204*f*, the second determination unit 204*g*, the booting unit 204*h*, the third determination unit 204*i*, and the first verification unit 204*j*, independently from the communication processing device 204, the CPU 2014, and the NAND controller 2016. Note that, in FIG. 27, the descriptions of the host interface controller 2011, the RAM 2012, the ROM 2013, and the ECC circuit 2015 are omitted.

Fourth Embodiment

In an information processing system 1 according to a fourth embodiment, the time period during which the second information processing device 20 is permitted to access the memory system 20*a* is limited, and the memory system 20*a* verifies whether the access is during the permitted time period.

<Configuration of Information Processing System>

Figure 28:
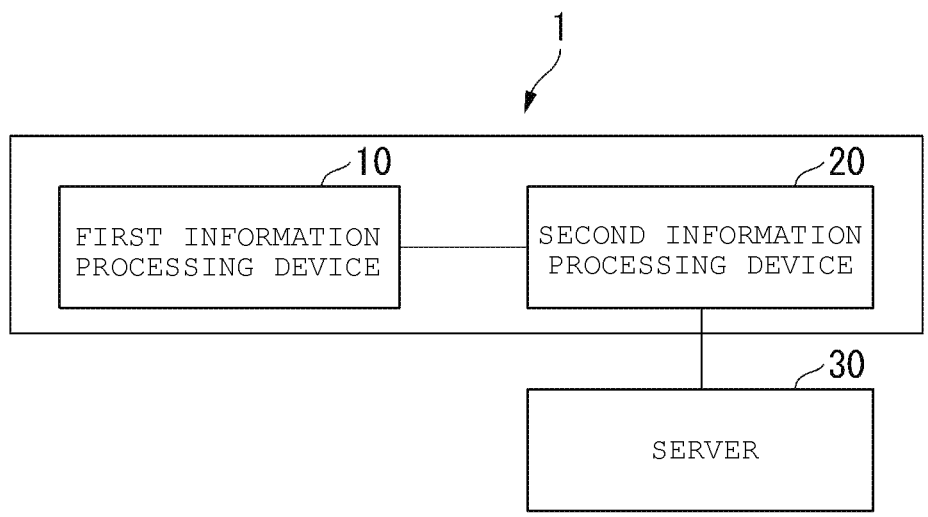
FIG. 28 is a diagram illustrating an example of a configuration of an information processing system according to a fourth embodiment, which is connected to a time stamp server.

FIG. 28 is a diagram illustrating an example of a configuration of the information processing system 1 according to the fourth embodiment. The information processing system 1 includes the first information processing device 10 and the second information processing device 20. As illustrated in FIG. 28, the information processing system 1 may be connected to a server 30. The server 30 is a time stamp server that issues a time stamp. The time stamp can be used to add, at a reliable time, additional information to certain digital information that enables to prove whether the content of the digital information is changed or falsified after the reliable time.

<Configuration of Second Information Processing Device>

Figure 29:
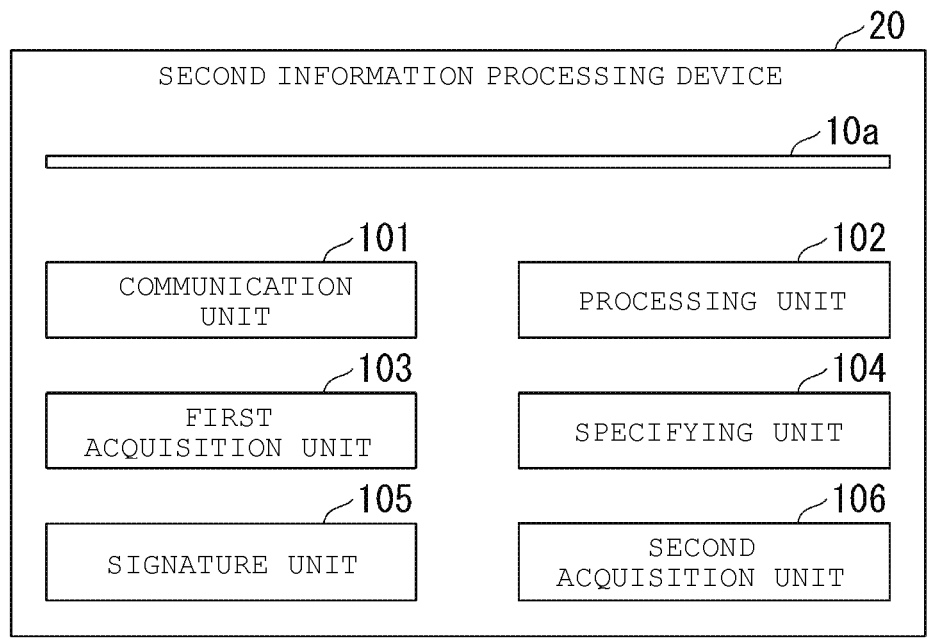
FIG. 29 is a diagram illustrating an example of a configuration of a second information processing device of the fourth embodiment.

FIG. 29 is a diagram illustrating an example of a configuration of the second information processing device 20 of the fourth embodiment. As illustrated in FIG. 29, the second information processing device 20 includes a second acquisition unit 106 in addition to the communication unit 101, the processing unit 102, the first acquisition unit 103, the specifying unit 104, and the signature unit 105. In addition, the second information processing device 20 includes the antenna 10*a*.

The second acquisition unit 106 acquires a time stamp from the server 30.

The signature unit 105 generates predetermined signature data for the time stamp to be transmitted to the first information processing device 10 together with an access request and the location data of the second information processing device 20. Also, the signature unit 105 transmits the time stamp to which the signature data is added to the first information processing device 10, together with the access request and the location data of the second information processing device 20.

<Configuration of Communication Processing Device>

Figure 30:
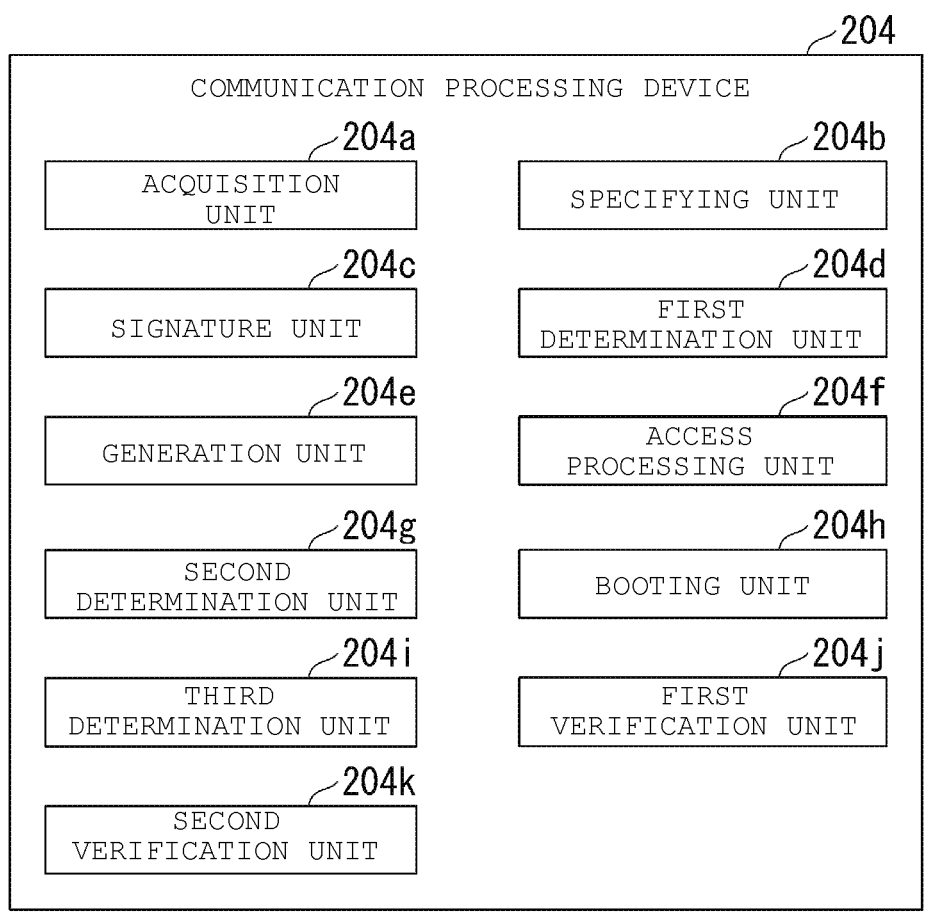
FIG. 30 is a diagram illustrating an example of a configuration of a communication processing device of the fourth embodiment.

FIG. 30 is a diagram illustrating an example of a configuration of the communication processing device 204. The communication processing device 204 is programmed or configured to function as a second verification unit 204*k* in addition to the acquisition unit 204*a*, the specifying unit 204*b*, the signature unit 204*c*, the first determination unit 204*d*, the generation unit 204*e*, the access processing unit 204*f*, the second determination unit 204*g*, the booting unit 204*h*, the third determination unit 204*i*, and the first verification unit 204*j*.

The second verification unit 204*k* verifies whether the time indicated by the time stamp received from the second information processing device 20 is within a predetermined time range. The time stamp is an example of time information. The predetermined time range is set as a time range during which the second information processing device 20 is permitted to access the memory system 20*a*. The predetermined time range is loaded from the memory chip 2021 into the RAM 2012, for example, at the operation start of the memory system 20*a*. FIG. 31 is a diagram illustrating an example of the predetermined time range. In FIG. 31, the predetermined time range is indicated by the start time and the end time during which the second information processing device 20 is accessible to the memory system 20*a*. The second verification unit 204*k* reads the predetermined time range (that is, accessible start time and accessible end time) written in the RAM 2012. The second verification unit 204*k* can verify whether the time indicated by the time stamp of the second information processing device 20 is within the predetermined time range by comparing the read predetermined time range and the time indicated by the time stamp received from the second information processing device 20.

If the first verification unit 204*j* verifies that the location of the second information processing device 20 is within the second predetermined range and the second verification unit 204*k* verifies that the time indicated by the time stamp is within the predetermined time range, the generation unit 204*e* generates the information relating to the encryption and decryption of data.

For example, when a write request of data is received from the second information processing device 20, the host device 20*b* outputs the write request to the memory system 20*a*. The CPU 2014 receives the write request via the host I/F controller 2011. When the CPU 2014 receives the write request, if the first verification unit 204*j* verifies that the location of the second information processing device 20 is within the second predetermined range, and the second verification unit 204*k* verifies the time stamp is within the predetermined time range, the generation unit 204*e* generates the encryption key based on the location of the memory system 20*a*. The encryption key is an example of the information relating to the encryption and decryption of data. In addition, when the CPU 2014 receives the write request, if the first verification unit 204*j* verifies that the location of the second information processing device 20 is not within the second predetermined range, or the second verification unit 204*k* verifies that the time stamp is not within the predetermined time range, the generation unit 204*e* does not generate the encryption key.

In addition, for example, when a read request of data is received from the second information processing device 20, the host device 20*b* outputs the read request to the memory system 20*a*. The CPU 2014 receives the read request via the host I/F controller 2011. When the CPU 2014 receives the read request, if the first verification unit 204*j* verifies that the location of the second information processing device 20 is within the second predetermined range, and the second verification unit 204*k* verifies that the time stamp is within the predetermined time range, the generation unit 204*e* generates the decryption key based on the location of the memory system 20*a*. The decryption key is an example of the information relating to the encryption and decryption of data. In addition, when the CPU 2014 receives the read request, if the first verification unit 204*j* verifies that the location of the second information processing device 20 is not within the second predetermined range, or the second verification unit 204*k* verifies that the time stamp is not within the predetermined time range, the generation unit 204*e* does not generate the decryption key.

If the generation unit 204*e* generates the information relating to the encryption and decryption of data, the access processing unit 204*f* enables at least one of a process of encrypting data to be written to the NAND memory 202 by the CPU 2014 or a process of decrypting the data read from the NAND memory 202 by the CPU 2014, by using the information relating to the encryption and decryption of data generated by the generation unit 204*e*.

For example, if the generation unit 204*e* generates the encryption key, the access processing unit 204*f* transmits the encryption key generated by the generation unit 204*e* to the memory controller 201. The CPU 2014 of the memory controller 201 encrypts the write data to be written to the NAND memory 202 by using the encryption key. Also, the NAND controller 2016 of the memory controller 201 writes the encrypted data to the NAND memory 202. If the generation unit 204*e* generates the decryption key, the access processing unit 204*f* transmits the decryption key generated by the generation unit 204*e* to the memory controller 201. The NAND controller 2016 of the memory controller 201 reads the encrypted data from the NAND memory 202. Also, the CPU 2014 of the memory controller 201 decrypts the encrypted data read from the NAND memory 202 by using the decryption key generated by the generation unit 204*e*.

<Process Performed in Memory System>

Subsequently, the process performed in the memory system 20*a* is described. FIG. 32 is a diagram illustrating an example of a process flow of the memory system 20*a*.

The second information processing device 20 transmits the time stamp to which the signature data is added to the host device 20*b*, together with the access request and the location data. The host device 20*b* transmits the time stamp to which the signature data is added to the memory system 20*a*, together with the access request and the location data.

The third determination unit 204*i* of the communication processing device 204 determines whether the signature data is the signature data of the second information processing device 20 by using the predetermined public key (Step S31).

If it is determined that the signature data is not the signature data of the second information processing device 20 (No in Step S31), the third determination unit 204*i* ends the process.

In addition, if the third determination unit 204*i* determines that the signature data is the signature data of the second information processing device 20 (Yes in Step S31), the first verification unit 204*j* verifies whether the location of the second information processing device 20 indicated by the location data of the second information processing device 20 received from the second information processing device 20 is within the second predetermined range (Step S32).

Specifically, the first verification unit 204*j* reads the information relating to the second predetermined range written in the RAM 2012. Also, the first verification unit 204*j* compares the read second predetermined range and the location data of the second information processing device 20 received from the second information processing device 20.

If the first verification unit 204*j* verifies that the location of the second information processing device 20 is not within the second predetermined range (No in Step S32), the first verification unit 204*j* ends the process.

If the first verification unit 204*j* verifies that the location of the second information processing device 20 is within the second predetermined range (Yes in Step S32), the second verification unit 204*k* verifies whether the time stamp received from the second information processing device 20 is within the predetermined time range (Step S33).

Specifically, the second verification unit 204*k* reads the information relating to the predetermined time range written in the RAM 2012. The second verification unit 204*k* compares the read predetermined time range and the time indicated by the time stamp received from the second information processing device 20. The second verification unit 204*k* verifies whether the time indicated by the time stamp is within the predetermined time range.

If the second verification unit 204*k* verifies that the time stamp is not within the predetermined time range (No in Step S33), the second verification unit 204*k* ends the process.

If the second verification unit 204*k* verifies that the time stamp is within the predetermined time range (Yes in Step S33), the generation unit 204*e* generates the information relating to the encryption and decryption of data (Step S23).

Specifically, when the host device 20*b* receives the write request of data from the second information processing device 20, the host device 20*b* outputs the write request to the memory system 20*a*. The CPU 2014 receives the write request via the host I/F controller 2011. When the CPU 2014 receives the write request, if the first verification unit 204*j* verifies that the location of the second information processing device 20 is within the second predetermined range, and the second verification unit 204*k* verifies that the time stamp received from the second information processing device 20 is within the predetermined time range, the generation unit 204*e* generates the encryption key based on the location of the memory system 20*a*. The encryption key is an example of the information relating to the encryption and decryption of data. In addition, when the CPU 2014 receives the write request, if the first verification unit 204*j* verifies that the location of the second information processing device 20 is not within the second predetermined range, or the second verification unit 204*k* verifies that the time stamp received from the second information processing device 20 is not within the predetermined time range, the generation unit 204*e* does not generate the encryption key.

Specifically, when the host device 20*b* receives a read request of data from the second information processing device 20, the host device 20b outputs the read request to the memory system 20a. The CPU 2014 receives the read request via the host I/F controller 2011. When the CPU 2014 receives the read request, if the first verification unit 204j verifies that the location of the second information processing device 20 is within the second predetermined range, and the second verification unit 204k verifies that the time stamp received from the second information processing device 20 is within the predetermined time range, the generation unit 204e generates the decryption key based on the location of the memory system 20a. The decryption key is an example of the information relating to the encryption and decryption of data. In addition, when the CPU 2014 receives the read request, if the first verification unit 204j verifies that the location of the second information processing device 20 is not within the second predetermined range, or the second verification unit 204k verifies that the time stamp received from the second information processing device 20 is not within the predetermined time range, the generation unit 204e does not generate the decryption key.

If the generation unit 204e generates the information relating to the encryption and decryption of data, the access processing unit 204f enables at least one of a process of encrypting data to be written to the NAND memory 202 by the CPU 2014 or a process of decrypting the data read from the NAND memory 202 by the CPU 2014, by using the information relating to the encryption and decryption of data generated by the generation unit 204e (Step S6).

<Advantage>

Hereinabove, the information processing system 1 according to the fourth embodiment has been described. In the memory system 20a of the information processing system 1, the second verification unit 204k verifies whether the time stamp received from the second information processing device 20 is within the predetermined time range. With such a configuration of the memory system 20a, if the second verification unit 204k verifies that the time stamp received from the second information processing device 20 is not within the predetermined time range, the generation unit 204e does not generate the information relating to the encryption and decryption of data. Therefore, in the first information processing device 10 of the fourth embodiment, the condition for accessing the data stored in the memory system 20a is further limited as compared with the first information processing device 10 of the first to third embodiments. As a result, in the first information processing device 10 of the fourth embodiment, the possibility of leakage of the data stored in the memory system 20a to the outside can be further reduced than the first information processing device 10 of the first to third embodiments. That is, the first information processing device 10 of the fourth embodiment can further improve the confidentiality of the data in the memory system 20a than the first information processing device 10 of the first to third embodiments.

First Modification of Fourth Embodiment

Figure 33:
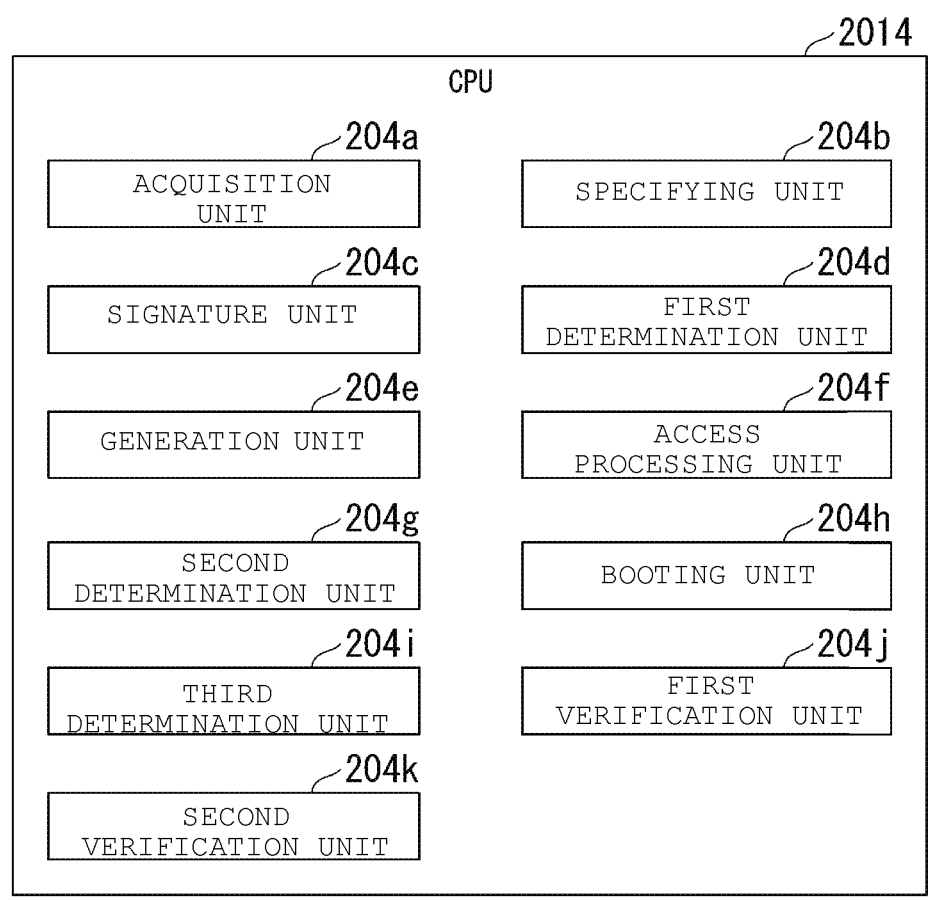
FIG. 33 is a diagram illustrating an example of a configuration of a CPU according to a first modification of the fourth embodiment.
Figure 34:
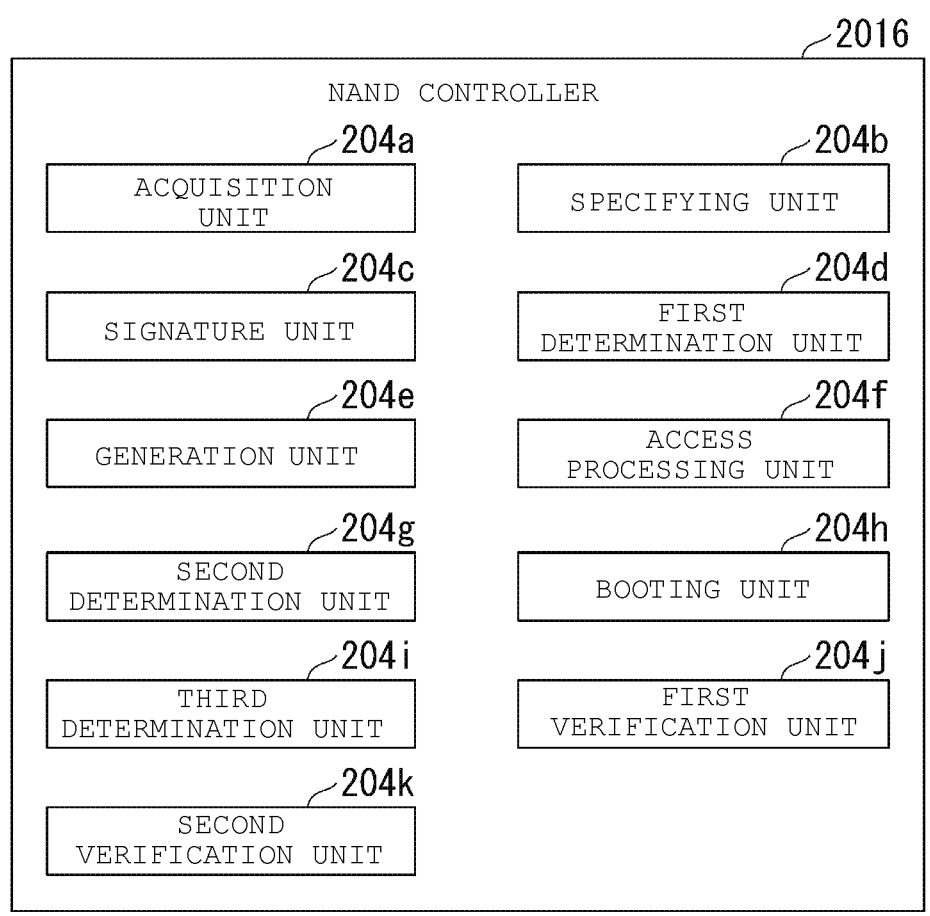
FIG. 34 is a diagram illustrating an example of a configuration of a NAND controller according to the first modification of the fourth embodiment.
Figure 35:
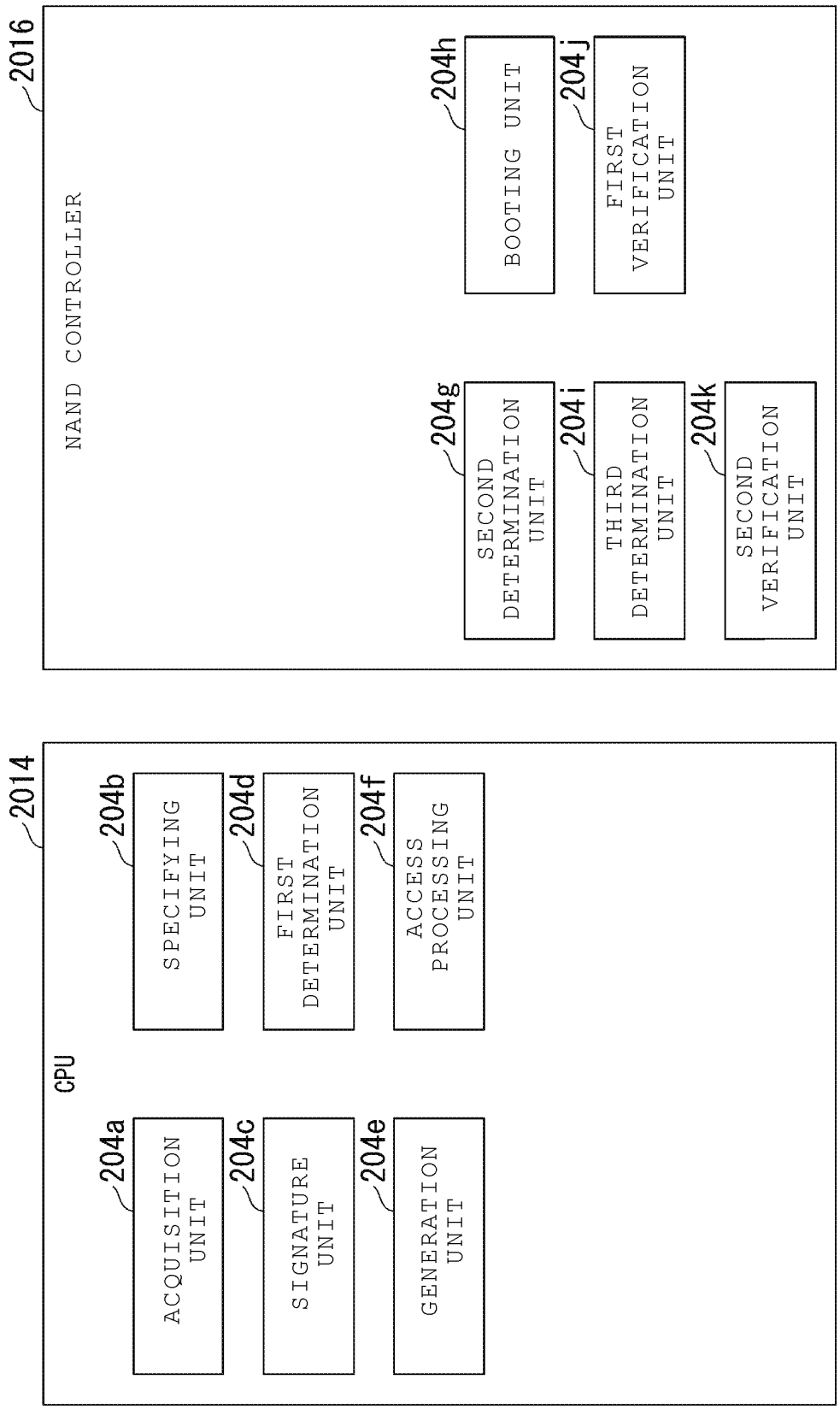
FIG. 35 is a diagram illustrating an example of a configuration of a CPU and a NAND controller according to the first modification of the fourth embodiment.

In the above fourth embodiment, the description is made so that, in the memory system 20a, the communication processing device 204 is programmed or configured to function as the acquisition unit 204a, the specifying unit 204b, the signature unit 204c, the first determination unit 204d, the generation unit 204e, the access processing unit 204f, the second determination unit 204g, the booting unit 204h, the third determination unit 204i, the first verification unit 204j, and the second verification unit 204k. However, in a first modification of the fourth embodiment, in the memory system 20a, the functionality of a part or all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, the first verification unit 204j, and the second verification unit 204k may be provided in the CPU 2014 or the NAND controller 2016. For example, as illustrated in FIG. 33, the CPU 2014 may include the functionality of all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, the first verification unit 204j, and the second verification unit 204k. In addition, for example, as illustrated in FIG. 34, the NAND controller 2016 may include the functionality of all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, the first verification unit 204j, and the second verification unit 204k. In addition, for example, as illustrated in FIG. 35, the CPU 2014 may include the functionality of the acquisition unit 204a, the specifying unit 204b, the signature unit 204c, the first determination unit 204d, the generation unit 204e, and the access processing unit 204f, and the NAND controller 2016 may include the functionality of the second determination unit 204g, the booting unit 204h, the third determination unit 204i, the first verification unit 204j, and the second verification unit 204k.

Second Modification of Fourth Embodiment

Figure 36:
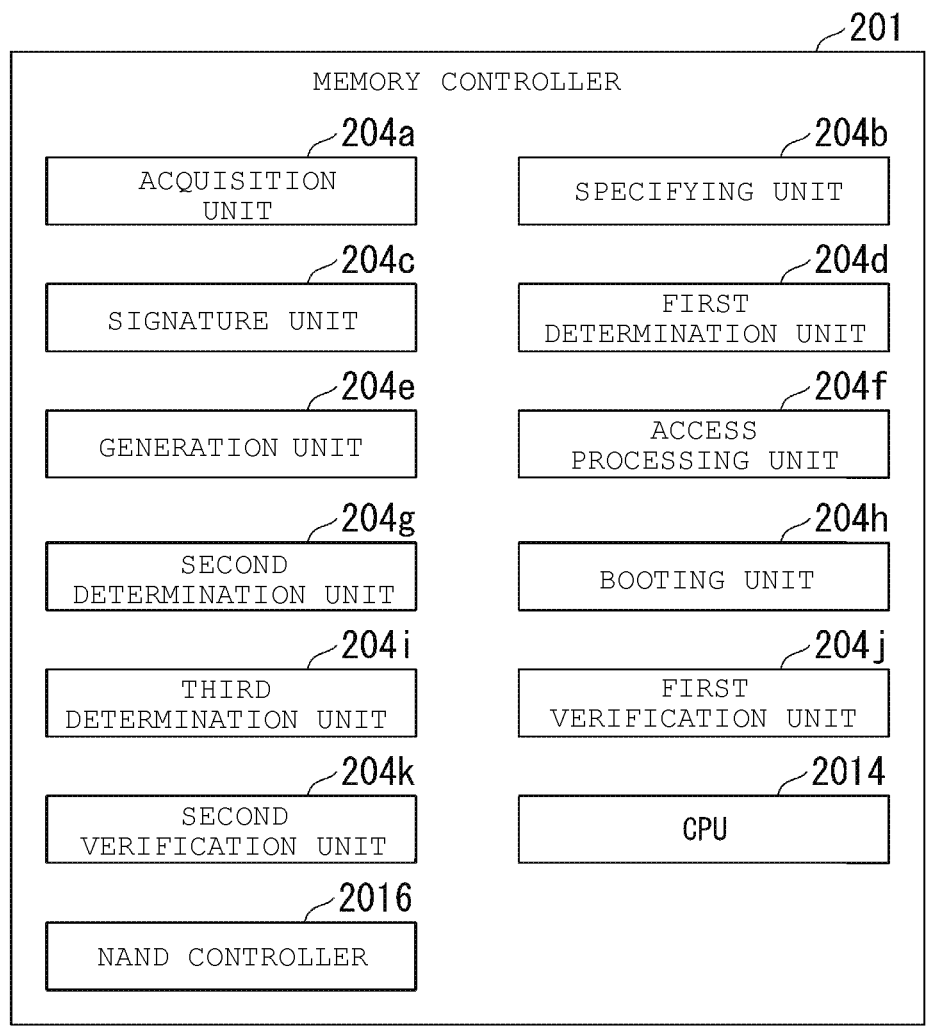
FIG. 36 is a diagram illustrating an example of a configuration of a memory controller according to a second modification of the fourth embodiment.

In addition, according to a second modification of the fourth embodiment, the functionality of a part or all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, the first verification unit 204j, and the second verification unit 204k are provided in the memory controller 201, independently from the communication processing device 204, the CPU 2014, and the NAND controller 2016. For example, as illustrated in FIG. 36, the memory controller 201 may include the functionality of all of the acquisition unit 204a, the specifying unit 204b, the signature unit 204c, the first determination unit 204d, the generation unit 204e, the access processing unit 204f, the second determination unit 204g, the booting unit 204h, the third determination unit 204i, the first verification unit 204j, and the second verification unit 204k, independently from the communication processing device 204, the CPU 2014, and the NAND controller 2016. Note that, in FIG. 36, the descriptions of the host interface controller 2011, the RAM 2012, the ROM 2013, and the ECC circuit 2015 are omitted.

In the embodiments and the modifications described above, the encryption key and the decryption key are described as independent ones, but according to another embodiment, the encryption key and the decryption key may be the same key.

In the above, some embodiments and modifications have been described but the embodiments are not limited to the above examples. The above embodiments and modifications may be implemented in combination with each other. A part or all of the functions of the memory controller 201 may be implemented by hardware (circuit unit; including a circuitry)

such as an application specific integrated circuit (ASIC), a programmable logic device (PLD), or a field programmable gate array (FPGA). In addition, the ordinal numbers such as "first" and "second" in the present specification are provided for the convenience of explanation and may be rearranged in a different order.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory; and
a controller configured to control the nonvolatile memory, wherein
the controller is configured to:
verify whether a location of the memory system is within a first predetermined range,
generate information relating to encryption and decryption of data based on the location of the memory system if the location is within the first predetermined range,
not generate the information if the location is outside the first predetermined range, and
enable at least one process of encrypting data to be written to the nonvolatile memory or decrypting data read from the nonvolatile memory by using the generated information.

2. The memory system according to claim 1, wherein the controller is configured to generate different information for different locations.

3. The memory system according to claim 1, wherein the controller includes a processor, and
the processor is programmed to generate the information if the location is within the first predetermined range, and not generate the information if the location is outside the first predetermined range.

4. The memory system according to claim 1, wherein the controller is further configured to, in response to an access request from an external device, the access request being received by a host device of the memory system:
verify whether the location of the external device is within a second predetermined range,
generate the information if the location of the external device is within the second predetermined range, and
not generate the information if the location of the external device is outside the second predetermined range.

5. The memory system according to claim 4, wherein the controller is further configured to:
determine a time when the external device transmits the access request to the host,
generate the information if the time is within a predetermined time range, and
not generate the information if the time is outside the predetermined time range.

6. The memory system according to claim 5, wherein the external device is a first mobile device configured to communicate wirelessly with a second device that includes the host device and the memory system.

7. The memory system according to claim 1, further comprising:
an antenna configured to receive radio waves to be used for specifying the location of the memory system.

8. The memory system according to claim 7, wherein
the antenna is an antenna configured to receive radio waves transmitted from a global navigation satellite system (GNSS) satellite.

9. The memory system according to claim 1, wherein
the controller is configured with a plurality of semiconductor integrated circuits.

10. A method of controlling access to a memory system including a nonvolatile memory and a controller configured to control reading data from the nonvolatile memory, comprising:
determining a location of the memory system;
verifying whether the location is within a first predetermined range;
in the controller, generating a key for decrypting data based on the location of the memory system, if the location is within the first predetermined range, wherein the key is not generated if the location is outside the first predetermined range; and
decrypting data read from the nonvolatile memory using the key.

11. The method of claim 10, wherein the controller generates different keys for different locations.

12. The method of claim 10, wherein the controller includes a processor and the processor is programmed to generate the key if the location is within the first predetermined range, and not generate the key if the location is outside the first predetermined range.

13. The method of claim 10, wherein the memory system further includes an antenna configured to receive radio waves to be used in determining the location of the memory system.

14. The method of claim 13, wherein the antenna is an antenna configured to receive radio waves transmitted from a global navigation satellite system (GNSS) satellite.

15. A mobile computing device comprising:
a host device; and
a memory system including a nonvolatile memory and a controller configured to control writing data to and reading data from the nonvolatile memory, wherein the controller is configured to, in response to a request to read from the memory system from another mobile computing device:
verify whether a location of said another mobile computing device is within a predetermined range;
generate a key relating to encryption and decryption of data based on a location of the memory system, if the location of said another mobile computing device is within the predetermined range;
not generate the key if the location of said another mobile computing device is outside the predetermined range; and
enable at least one process of encrypting data to be written to the nonvolatile memory or decrypting data read from the nonvolatile memory by using the generated key.

16. The mobile computing device of claim 15, wherein the location of said another mobile computing device is specified in the request.

* * * * *